United States Patent [19]
Sakata et al.

[11] Patent Number: 5,777,664
[45] Date of Patent: Jul. 7, 1998

[54] VIDEO COMMUNICATION SYSTEM USING A REPEATER TO COMMUNICATE TO A PLURALITY OF TERMINALS

[75] Inventors: Tsuguhide Sakata, Sagamihara; Masato Sugawara, Tama, both of Japan

[73] Assignee: Canon Kabushiki Kaisha, Tokyo, Japan

[21] Appl. No.: 558,186

[22] Filed: Nov. 15, 1995

[30] Foreign Application Priority Data

| Nov. 18, 1994 | [JP] | Japan | 6-285258 |
| Dec. 6, 1994 | [JP] | Japan | 6-302075 |

[51] Int. Cl.$^6$ .................................................. H04N 7/14
[52] U.S. Cl. ........................................... 348/16; 348/17
[58] Field of Search ................................ 348/13–18, 461, 348/467, 473, 476–479, 691, 693; 379/90, 202; 370/260, 266, 408, 480, 522, 529, 265; 375/220, 213, 219, 377

[56] References Cited

U.S. PATENT DOCUMENTS

| 3,889,063 | 6/1975 | Slavin | 179/15 A |
| 4,191,969 | 3/1980 | Briand et al. | 348/14 |
| 4,910,604 | 3/1990 | Takei et al. | 358/310 |
| 4,953,159 | 8/1990 | Hayden et al. | 370/265 |
| 5,343,240 | 8/1994 | Yu | 348/14 |
| 5,408,261 | 4/1995 | Kamata et al. | 348/17 |
| 5,491,508 | 2/1996 | Friedell et al. | 348/14 |
| 5,512,937 | 4/1996 | Beierle | 379/90 |

FOREIGN PATENT DOCUMENTS

| 7038583 | 2/1995 | Japan . |

OTHER PUBLICATIONS

European Search Report dated Jul. 11, 1996.

*Primary Examiner*—Curtis A. Kuntz
*Assistant Examiner*—Stephen W. Palan
*Attorney, Agent, or Firm*—Fitzpatrick, Cella, Harper & Scinto

[57] ABSTRACT

A video communication system includes a terminal unit for transmitting/receiving an information signal including video information, and a repeater to which a plurality of terminal units identical to the terminal unit can be connected. The repeater forms a transmission signal to be sent to a transmission line by frequency-multiplexing information signals respectively transmitted from the plurality of connected terminal units. The repeater also receives a transmission signal supplied from the transmission line and supplies a plurality of information signals frequency-multiplexed with the input transmission signal to a corresponding terminal unit. With this arrangement, an inexpensive, easy-to-use video communication system which suffers little deterioration in image quality and sound quality can be provided.

25 Claims, 23 Drawing Sheets

VIDEO COMMUNICATION SYSTEM USING A REPEATER TO COMMUNICATE TO A PLURALITY OF TERMINALS

BACKGROUND OF THE INVENTION

1. Field of the Invention

The present invention relates to a video communication system in which video information, audio information, and data are exchanged between a plurality of terminal units.

2. Related Background Art

As conventional systems for allowing exchange of video information, audio information, and data between a plurality of terminal units, a television telephone system, a television conference system, and the like are available.

For example, as conventional television telephones, an analog television telephone and a digital television telephone, which has recently been developed, are available. In the analog television telephone, a composite transmission signal formed by synthesizing video information, audio information, and data is modulated into a signal in a transmission frequency band (300 Hz to 3.4 kHz) in a general analog telephone line by a modulator, and the resultant signal is sent to the analog telephone line. The digital television telephone is designed to transmit video information, audio information, and data as digital data by using an ISDN (Integrated Service Digital Network).

In the analog television telephone system, since video information, audio information, and data are transmitted through an analog telephone line, switching of a plurality of terminals is performed by an analog private branch exchange (called a PBX). In the digital television telephone system, switching of a plurality of terminals is performed by a digital private branch exchange.

In the above conventional television telephone systems, the following drawbacks are posed.

In the analog television telephone system using a general analog telephone line, since the effective transmission band of the telephone line is limited to 100 Hz to 3.4 kHz, even the maximum transmission rate is about 30 Kbps at present.

In contrast to this, the data rate of video information is 216 Mbps if, for example, a television signal conforming to the NTSC scheme is to be transmitted without compression of information by the H. 261 (13.5 MHz; Y:U:V=4:2:2) scheme of ITU-T. In addition, in order to ensure sound quality equivalent to that in ISDN transmission, the amount of audio information which can be transmitted is 64 Kbps because an audio signal must be sampled in accordance with a clock having a frequency of 8 kHz. When, therefore, video information and audio information are to be transmitted through the above analog telephone line, the total information amount is 216 Mbps+64 Kbps. For this reason, the video information is compressed from 216 Mbps to 28.8 Kbps; and the audio information, from 64 Kbps to 3.2 Kbps, so that the total information amount becomes 32 Kbps, which can be transmitted through the analog telephone line. After such compression, these pieces of information are transmitted.

The above compression of information amounts involves various drawbacks. For example, the image quality of transmitted video information is very low. Since the frame rate of video information to be transmitted, in transmitting moving image information, is low, the motions of images are unnatural. The sound quality of transmitted audio information is lower than that through a general telephone. A time lag occurs between transmitted video information and audio information. At present, the above analog television telephone system is used as far as the necessity supersedes the above drawbacks, e.g., when long-distance calls are made abroad and at home. This system, however, is not widely used.

In the case of the digital television telephone system using an ISDN, similar to the case of the analog television telephone system, information amounts must be considerably compressed because the basic transmission rate in the ISDN is 64 Kbps. For this reason, the digital television telephone system has the same drawbacks as those in the analog television telephone system. At present, the digital television telephone system is therefore limited to high-end uses, e.g., to save business trip expenses, conference costs, time, and the like and for long-distance conferences and the like using television conference systems. This system is not widely used either.

FIG. 1 shows the arrangement of a network in a conventional television conference system. Referring to FIG. 1, this arrangement includes terminal units 1 to 4 for television conferences, a digital communication network 10, and a multi-point television conference control apparatus 5.

As shown in FIG. 1, the terminal units 1 to 4 and the multi-point television conference control apparatus 5 are connected to each other through digital bidirectional lines of 64 Kb/s of 2B+D of an ISDN (Integrated Services Digital Network). A multi-point television conference is held by exchanging video and audio data between the terminal units. Note that a digital communication network such as an ISDN network is used as the digital communication network 10.

FIG. 2 shows the arrangement of the multi-point television conference control apparatus 5 in FIG. 1. Referring to FIG. 2, the multi-point television conference control apparatus 5 includes interfaces 6 to 9 for line, coding-decoding devices 11 to 14 for video, coding-decoding devices 21 to 24 for audio, a switching distributor 31 for video, a switching distributor 32 for audio, a call control unit 41, and a control unit 42.

In the arrangements in FIGS. 1 and 2, the terminal units 1 to 4 and the interfaces 6 to 9 are connected through bidirectional digital lines which have a transmission rate of about 64 Kb/s and are ON/OFF-controlled in accordance with a command from the call control unit 41.

Referring to FIG. 2, upon reception of a television conference set request generated by the terminal unit 1, the control unit 42 commands the call control unit 41 to set a line between the terminal unit 1 and another one of the terminal units 2 to 4.

When, for example, transmission data including video and audio data signals transmitted from the terminal unit 1 is supplied to the interface 6 through the digital communication network 10, the interface 6 separates the video and audio data from the supplied transmission data. The separated video data is decoded by the coding-decoding device 11 and is supplied to the switching distributor 31. The separated audio data is decoded by the coding-decoding device 21 and is supplied to the switching distributor 32.

The switching distributor 31 performs line connection in accordance with a command from each terminal unit to supply a video signal to one of the terminal units 2 to 4 to which the line is connected by the control unit 42. In addition, the switching distributor 31 codes a video signal transmitted from another terminal unit through the connected line by using the coding-decoding device 11, and supplies the resultant signal to the interface 6. The switching distributor 32 causes the coding-decoding device 21 to code an audio signal formed by (N−1) addition processing of adding audio signals transmitted from terminal units other than the self terminal unit, and supplies the resultant signal to the interface 6. With this operation, the supplied video and audio data are multiplexed in the interface 6, and the resultant data is transmitted to the terminal unit 1 through the digital communication network 10. The same operation as described above is performed with respect to the remaining interfaces 7 to 9.

As described above, in the conventional television conference system, since a digital communication network is used as the communication network for the system, a telephone for an analog line cannot be directly connected to the network of the television conference system through, e.g., an extension analog telephone line. If, therefore, long-distance conversation or speech communication is to be performed by using a telephone for an analog line and an external terminal unit for a television conference, a general analog telephone line is required in addition to the network of the television conference system using the above digital communication network. Assume that an extension conversation is to be performed by using an extension terminal unit for a television conference and an extension analog telephone which are connected to a single PBX. Even in this case, the extension conversation cannot be performed by using only an extension analog telephone line.

In performing the above conversation, different calling methods must be used depending on whether a distant terminal is a terminal unit for a television conference or an analog telephone. That is, the calling operation is cumbersome, and hence is not easy to perform. In addition, in performing conversation between a terminal unit for a television conference and an analog telephone, both digital and analog networks are used, resulting in a high communication cost.

SUMMARY OF THE INVENTION

It is an object of the present invention to provide a video communication system which can solve the above problems.

It is another object of the present invention to provide a video communication system which suffers little deterioration in image quality and sound quality.

In order to achieve the above objects, according to one aspect of the present invention, there is provided a video communication system comprising a terminal unit for transmitting/receiving an information signal including video information, and a repeater to which a plurality of terminal units identical to the terminal unit can be connected, the repeater forming a transmission signal to be sent to a transmission line by frequency-multiplexing information signals respectively transmitted from the plurality of connected terminal units, or receiving a transmission signal supplied from the transmission line and supplying a plurality of information signals frequency-multiplexed with the input transmission signal to a corresponding terminal unit.

It is still another object to provide an inexpensive video communication system.

In order to achieve the above object, according to another aspect of the present invention, there is provided a video communication system comprising a terminal unit for transmitting/receiving an information signal including video information, a repeater to which a plurality of terminal units identical to the terminal unit can be connected, the repeater forming a transmission signal to be sent to a transmission line by frequency-multiplexing information signals respectively transmitted from the plurality of connected terminal units, or receiving a transmission signal supplied from the transmission line and supplying a plurality of information signals frequency-multiplexed with the input transmission signal to the corresponding terminal units, and an exchange to which a plurality of repeaters each identical to the repeater can be connected, the exchange connecting a communication channel between arbitrary terminal units of the plurality of terminal units respectively connected to the connected repeaters to allow communication of the information signal between the arbitrary terminal units.

It is still another object of the present invention to provide a video communication system which allows connection of a telephone, is easy to operate, and can perform communication at a low cost.

In order to achieve the above object, according to still another aspect of the present invention, there is provided a video communication system comprising a terminal unit for transmitting/receiving a data string including video and audio data, a repeater to which a plurality of terminal units each identical to the terminal unit can be connected, the repeater classifying various data included in data strings respectively output from the plurality of connected terminal units in units of types, and multiplexing the classified data in units of types, thereby forming transmission data to be transmitted through a network, or receiving transmission data supplied from the network, classifying various data, which are multiplexed in units of types and included in the input transmission data, in units of types, and respectively supplying the classified data to the plurality of connected terminal units, an exchange which is connected to the network and to which a plurality of repeaters each identical to the repeater can be connected, the exchange connecting a communication channel between arbitrary terminal units of the plurality of terminal units respectively connected to the connected repeaters to allow communication of the transmission data between the arbitrary terminal units, and connecting the network to a telephone line, and a telephone which can be connected to the telephone line.

The above and other objects, features, and advantages of the present invention will be apparent from the following detailed description in conjunction with the accompanying drawings and the appended claims.

DETAILED DESCRIPTION OF THE PREFERRED EMBODIMENTS

The arrangement of the first embodiment of the present invention will be described first.

Figure 1:
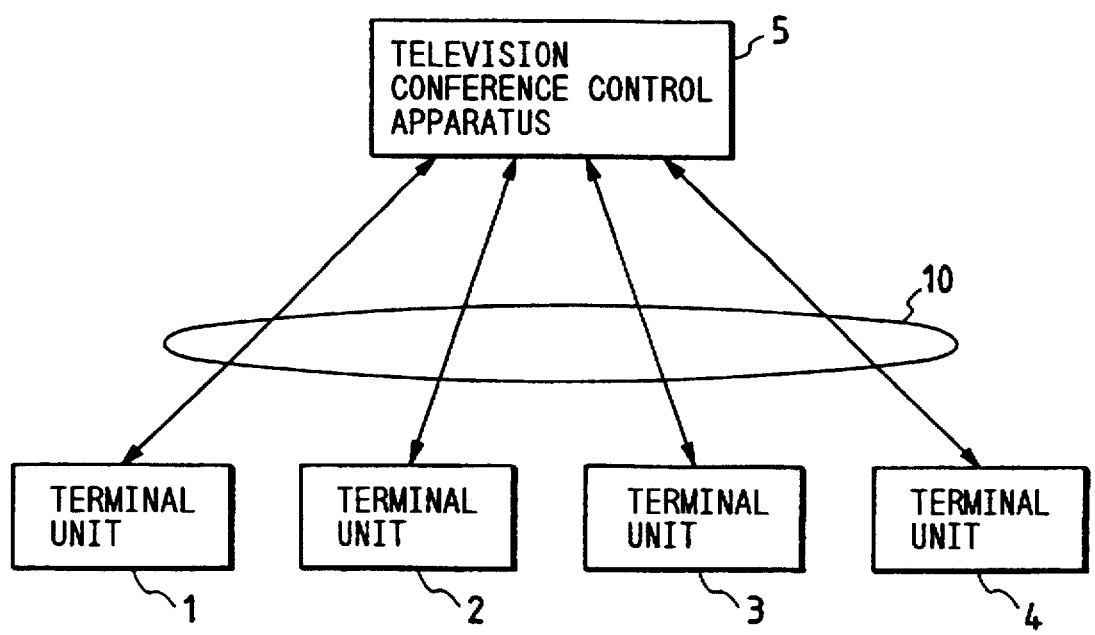
FIG. 1 is a block diagram showing the arrangement of a network in a conventional multi-point television conference system.
Figure 2:
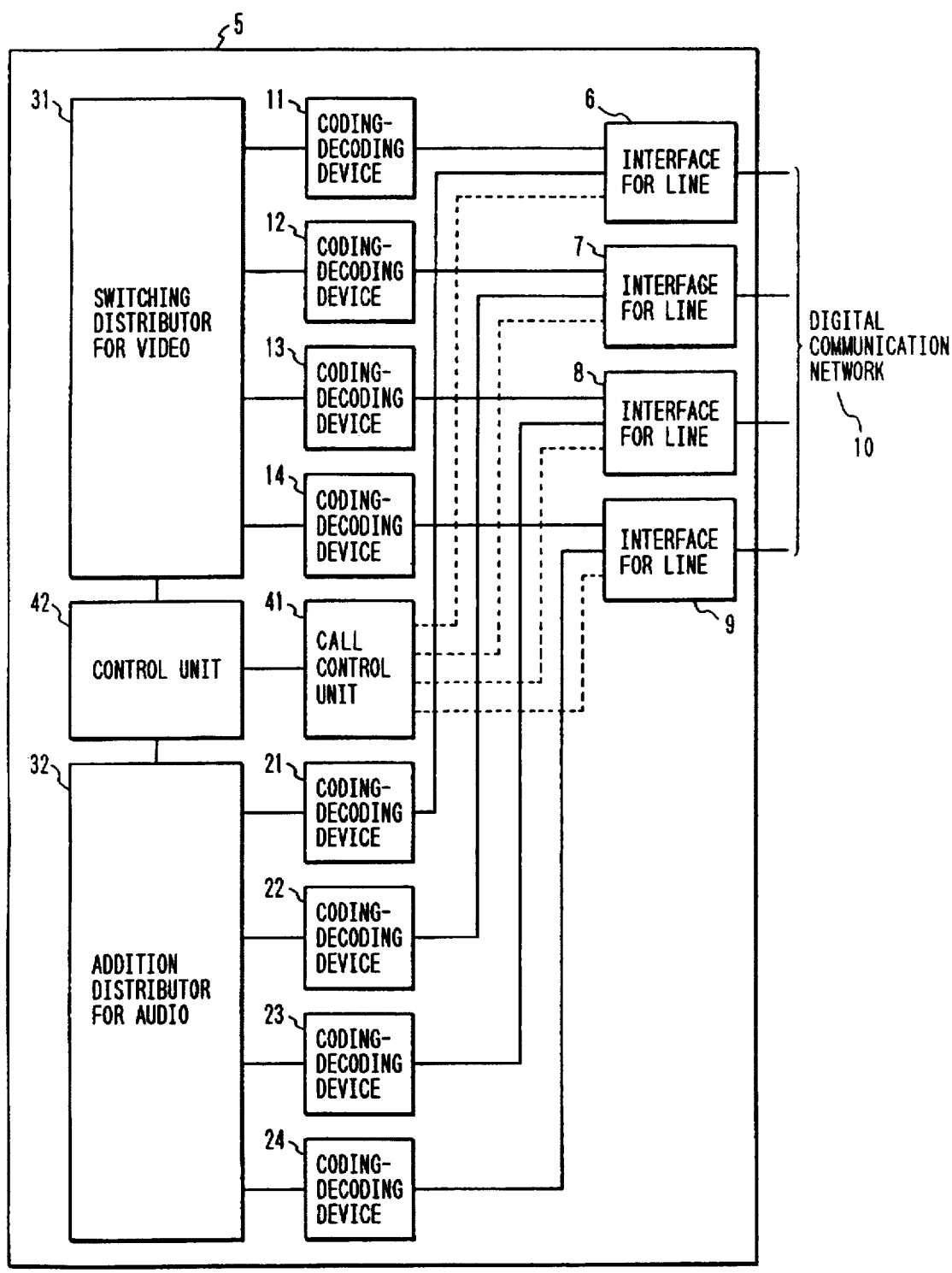
FIG. 2 is a block diagram showing the arrangement of a multi-point television conference control apparatus in FIG. 1.
Figure 3:
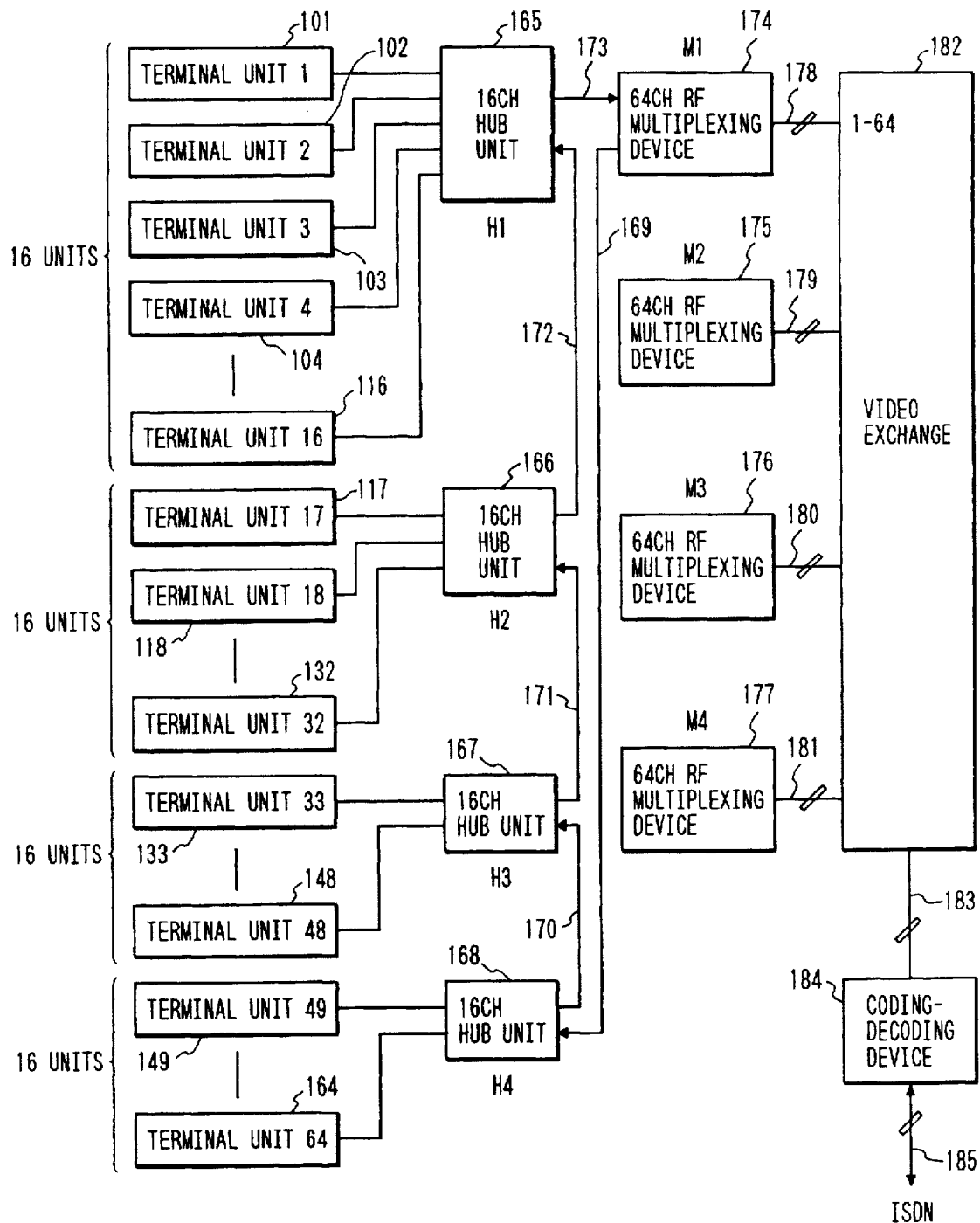
FIG. 3 is a block diagram showing the overall arrangement of a video communication system according to the first embodiment of the present invention.

FIG. 3 is a block diagram showing the overall arrangement of a video communication system according to an embodiment of the present invention. Referring to FIG. 3, the system includes terminal units 101 to 164, 16 CH RF multiplexing devices (to be referred to as 16 CH hub units hereinafter) 165 to 168, 64 CH RF multiplexing devices 174 to 177 for respectively sending/receiving information to/from the four 16 CH hub units 165 to 168, coaxial cables 169 to 173 for connecting the 16 CH hub units 165 to 168 and the 64 CH RF multiplexing devices 174 to 177 to each other, a video exchange 182, groups of input/output line groups 178 to 181, each including input/output lines corresponding to 64 channels and serving to connect each of the 64 CH RF multiplexing devices 174 to 177 to the video exchange 182, a coding-decoding device 184, an input/output line 183 for connecting the video exchange 182 to the coding-decoding device 184, and an input/output line 185 for connecting the coding-decoding device 184 to an ISDN.

Figure 4:
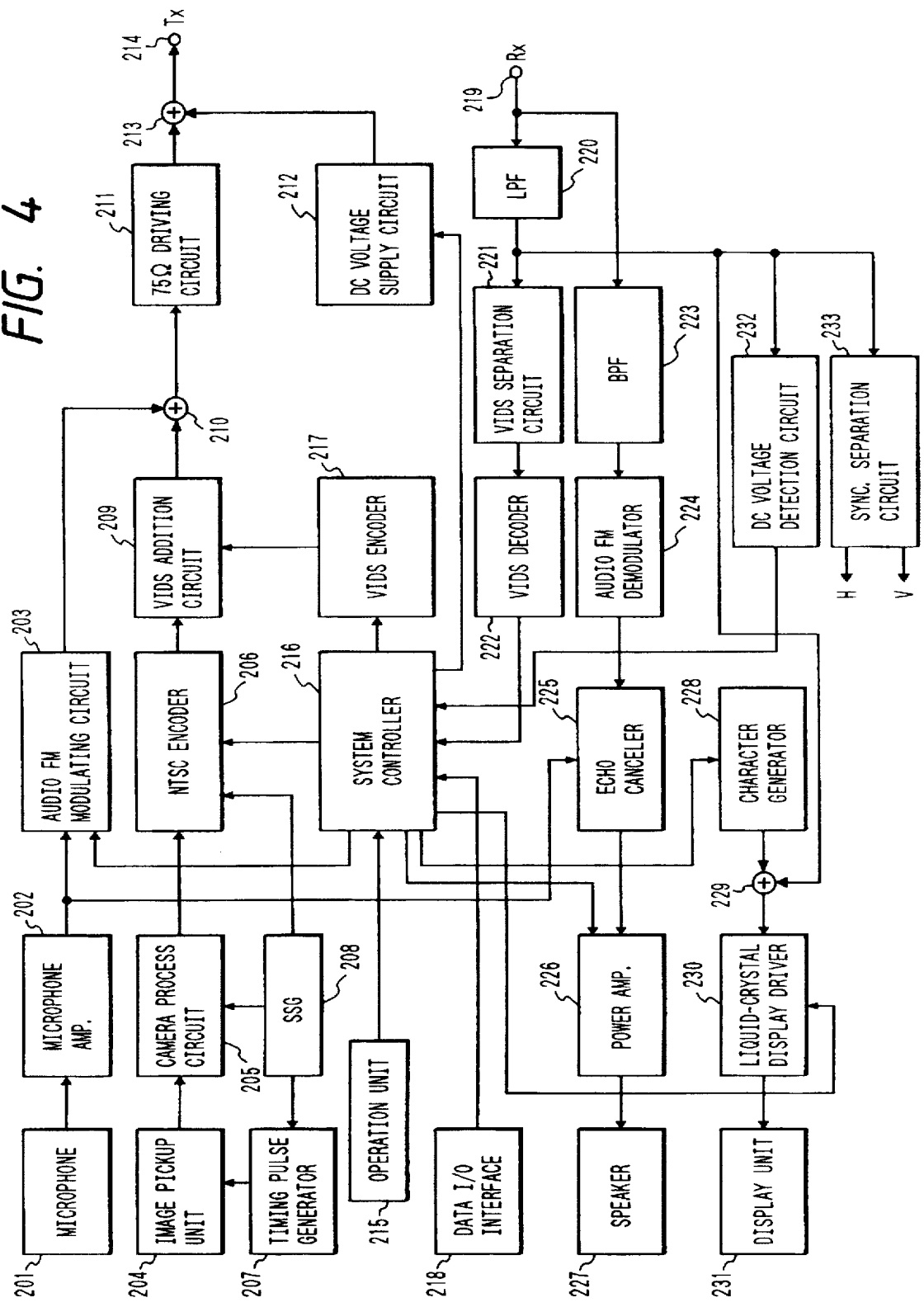
FIG. 4 is a block diagram showing the arrangement of a terminal unit in FIG. 3.

FIG. 4 is a block diagram showing the arrangement of each of the terminal units 101 to 164 in the video communication system in FIG. 3. Referring to FIG. 4, each terminal unit includes a microphone 201, a microphone amplifier 202, an audio FM modulating circuit 203, an image pickup unit 204 having an image pickup element such as a CCD, a camera process circuit 205, an NTSC encoder 206, a timing pulse generator 207 for generating a timing pulse for driving the image pickup element in the image pickup unit 204, a sync. signal generator (to be referred to as an SSG hereinafter) 208, a VIDS (Vertical Interval Data Signal) addition circuit 209 for adding a data signal to the vertical blanking period of a video signal, an adder 210 for adding an audio FM signal to a video signal with a VIDS, a 75 Ω driving circuit 211, a DC voltage supply circuit 212, a DC voltage adder 213 for adding a DC voltage applied from the DC voltage supply circuit 212 to a signal output from the 75 Ω driving circuit 211, a transmission output terminal 214 of the terminal unit, an operation unit 215, a system controller 216, a VIDS encoder 217, a data input/output (I/O) interface 218 of the terminal unit, a reception input terminal 219 of the terminal unit, a low-pass filter 220 for separating a video signal, a VIDS separation circuit 221, a VIDS decoder 222, a bandpass filter 223 for separating an audio FM signal, an audio FM demodulator 224, an echo canceler 225, a power amplifier 226 for driving a speaker, a speaker 227, a character generator 228 for generating a character signal, an adder 229 for adding a character signal output from the character generator 228 to a received video signal, a display unit 231 having a liquid crystal display element (LCD), a liquid-crystal display driver 230 for driving the liquid crystal display element of the display unit 231, a DC voltage detection circuit 232, and a sync. separation circuit 233 for separating horizontal and vertical sync. signals from a received signal.

Figure 5:
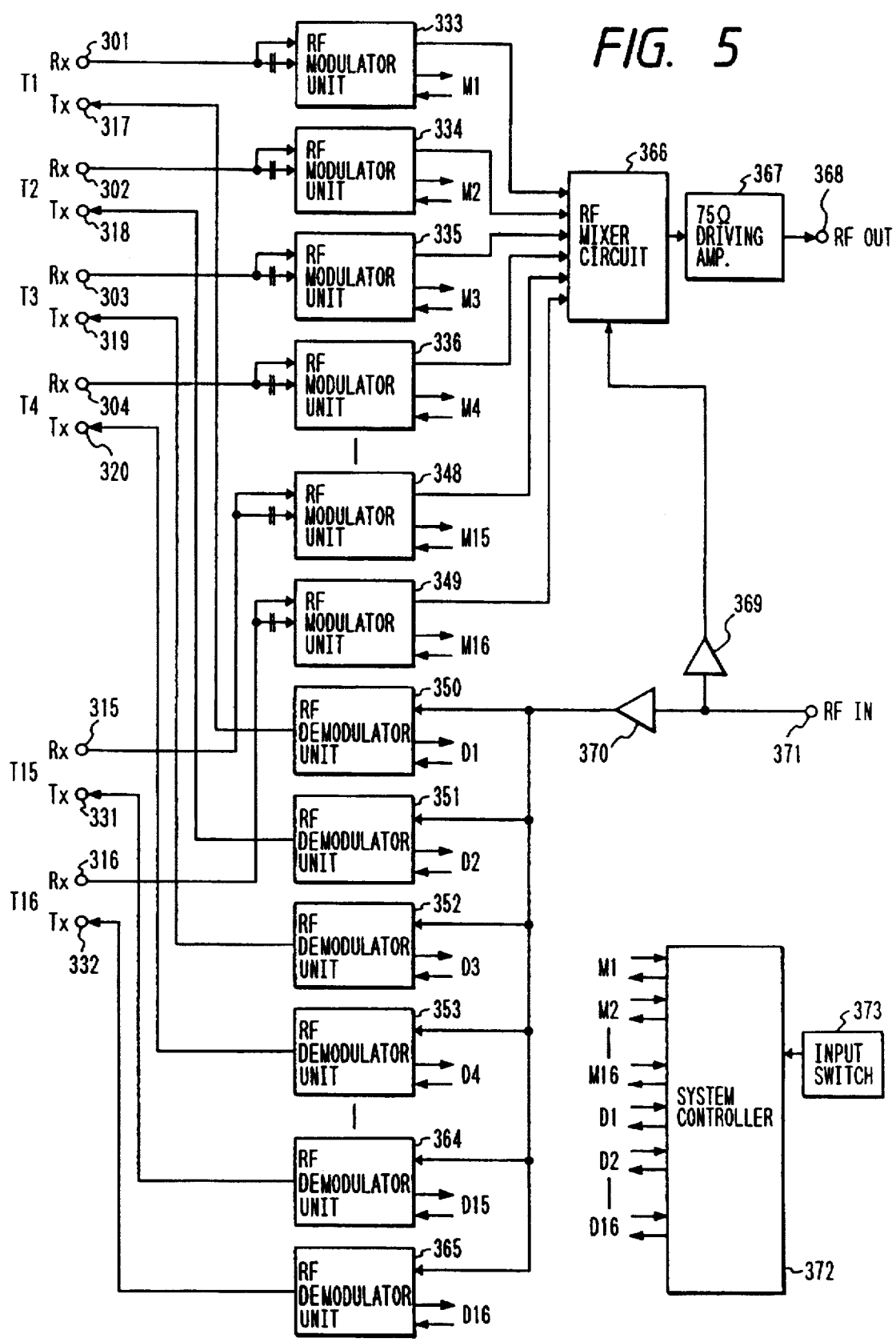
FIG. 5 is a block diagram showing the arrangement of a 16 CH RF multiplexing device in FIG. 3.

FIG. 5 is a block diagram showing the arrangement of each of the 16 CH hub units 165 to 168 in the video communication system in FIG. 3. Referring to FIG. 5, each 16 CH hub unit (the 16 CH hub unit 165 in this case) includes input terminals 301 to 316 for respectively inputting signals transmitted from the terminal units 101 to 116, output terminals 317 to 332 for respectively outputting signals to the terminal units 101 to 116, RF modulator units 333 to 349 (each RF modulator is designed to operate by using the DC component of a signal, as power, which is sent from each terminal connected in the manner to be described later) for respectively modulating signals sent from the terminal units 101 to 116 into signals in RF bands respectively assigned to the terminal units, RF demodulator units 350 to 365 for respectively demodulating input multiplex RF signals into signals in RF bands respectively assigned to the terminal units, and outputting the resultant signals to the terminal units 101 to 116, respectively, an RF mixer circuit 366, a 75 Ω driving amplifier 367, a multiplex RF signal output terminal 368 for outputting a multiplex RF signal to the 16 CH hub unit on the output side, buffer amplifiers 369 and 370, a multiplex RF signal input terminal 371 for inputting a multiplex RF signal sent from the 16 CH hub unit on the input side, a system controller 372, and an input switch 373 for assigning an RF band to each terminal unit.

Figure 6:
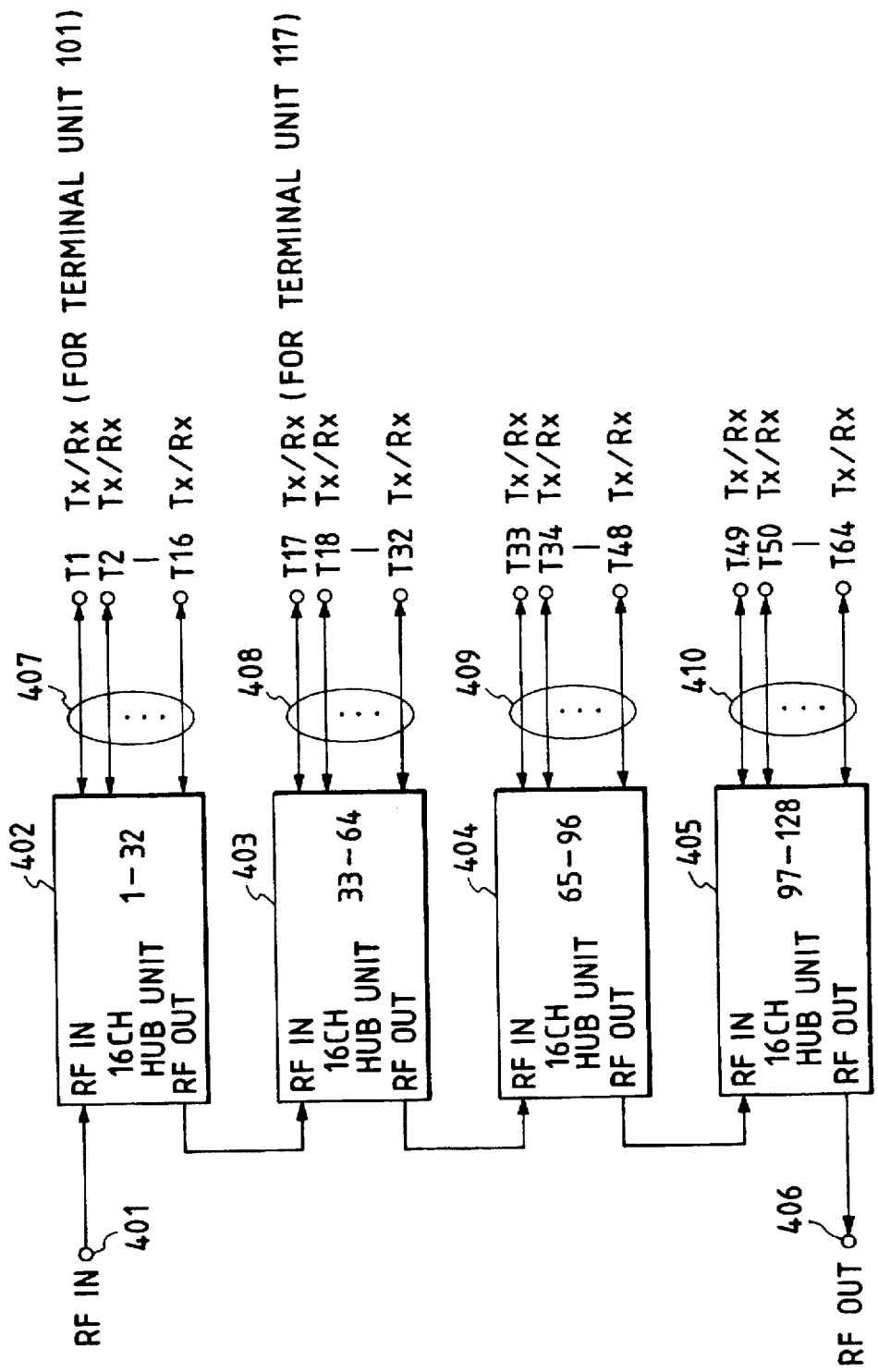
FIG. 6 is a block diagram showing the arrangement of a 64 CH RF multiplexing device in FIG. 3.

FIG. 6 is a block diagram showing the arrangement of each of the 64 CH RF multiplexing devices 174 to 177 in the video communication system in FIG. 3. Referring to FIG. 6, each 64 CH RF multiplexing device includes an input terminal 401 for inputting a multiplex RF signal, 16 CH hub units 402 to 405 each identical to the one shown in FIG. 5, an output terminal 406 for outputting a multiplex RF signal, and groups of input/output lines 407 to 410 each including input/output lines for 16 channels and connected to a corresponding one of the 16 CH hub units.

Figure 7:
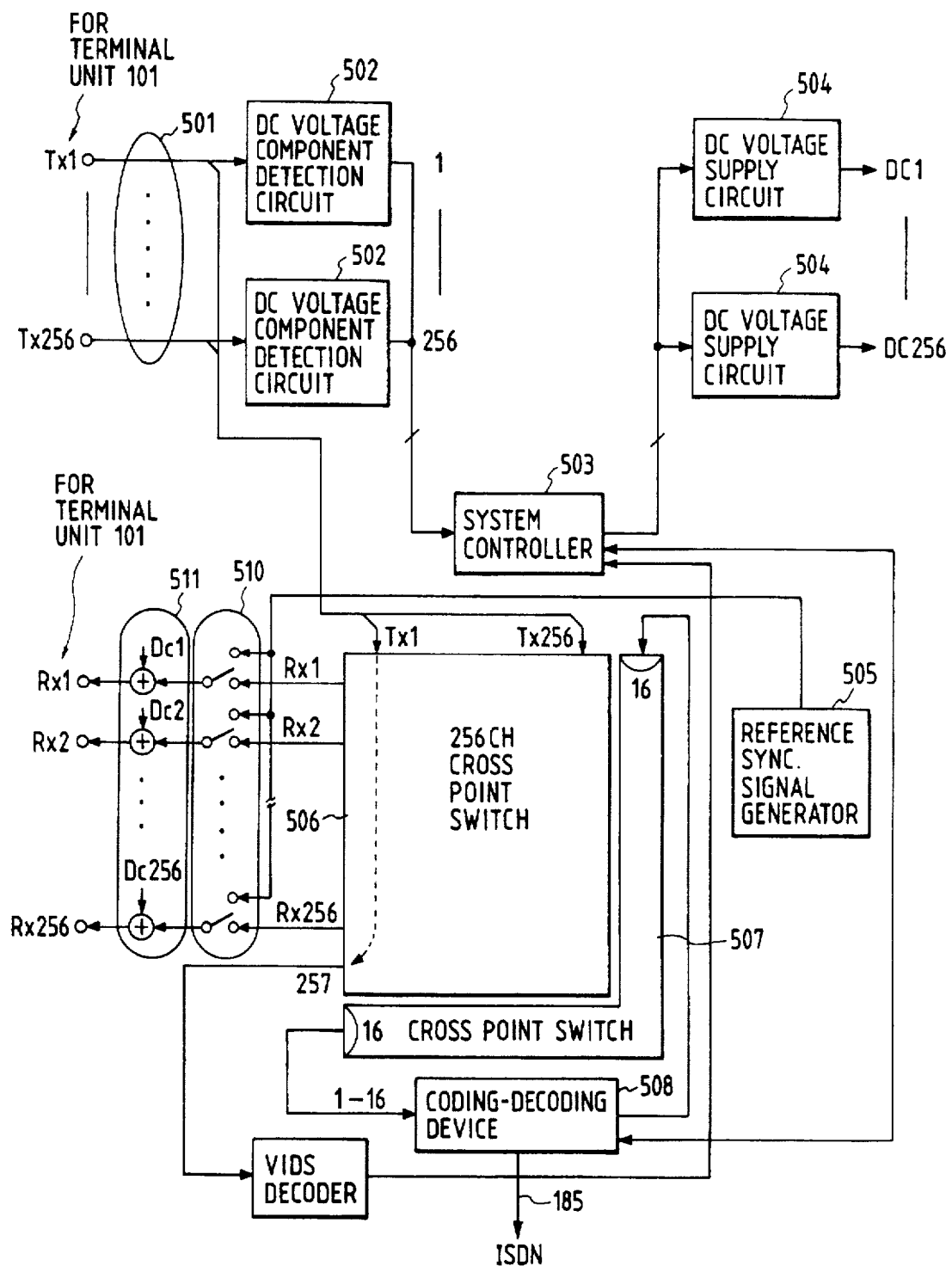
FIG. 7 is a block diagram showing the arrangement of a video exchange in FIG. 3.

FIG. 7 is a block diagram showing the arrangement of the video exchange 182 in the video communication system in FIG. 3. Referring to FIG. 7, input signals 501 corresponding to a total of 256 channels are transmitted from the four 64 CH RF multiplexing devices 174 to 177. The video exchange 182 includes 256 DC voltage component detection circuits 502 for respectively detecting the DC voltage components of the input signals for 256 channels, a system controller 503 for sequentially scanning and sampling the detection signals for 256 channels, respectively output from the DC voltage component detection circuits 502, at high speed, and controlling an exchanging operation to be described later, a DC voltage supply circuit 504 for applying DC voltages to be respectively added to the output signals for 256 channels, a reference sync. signal generator 505, a 256 CH cross point switch 506, a coding-decoding device 508 (corresponding to the coding-decoding device 184 in FIG. 3) which is used to transmit/receive an information signal through the ISDN, a cross point switch 507 for the coding-decoding device 508, a VIDS decoder 509, 256 switches 510 for respectively switching a reference sync. signal generated by the reference sync. signal generator 505 and signals output from the 256 CH cross point switch 506, and 256 DC voltage adders 511.

Figure 8:
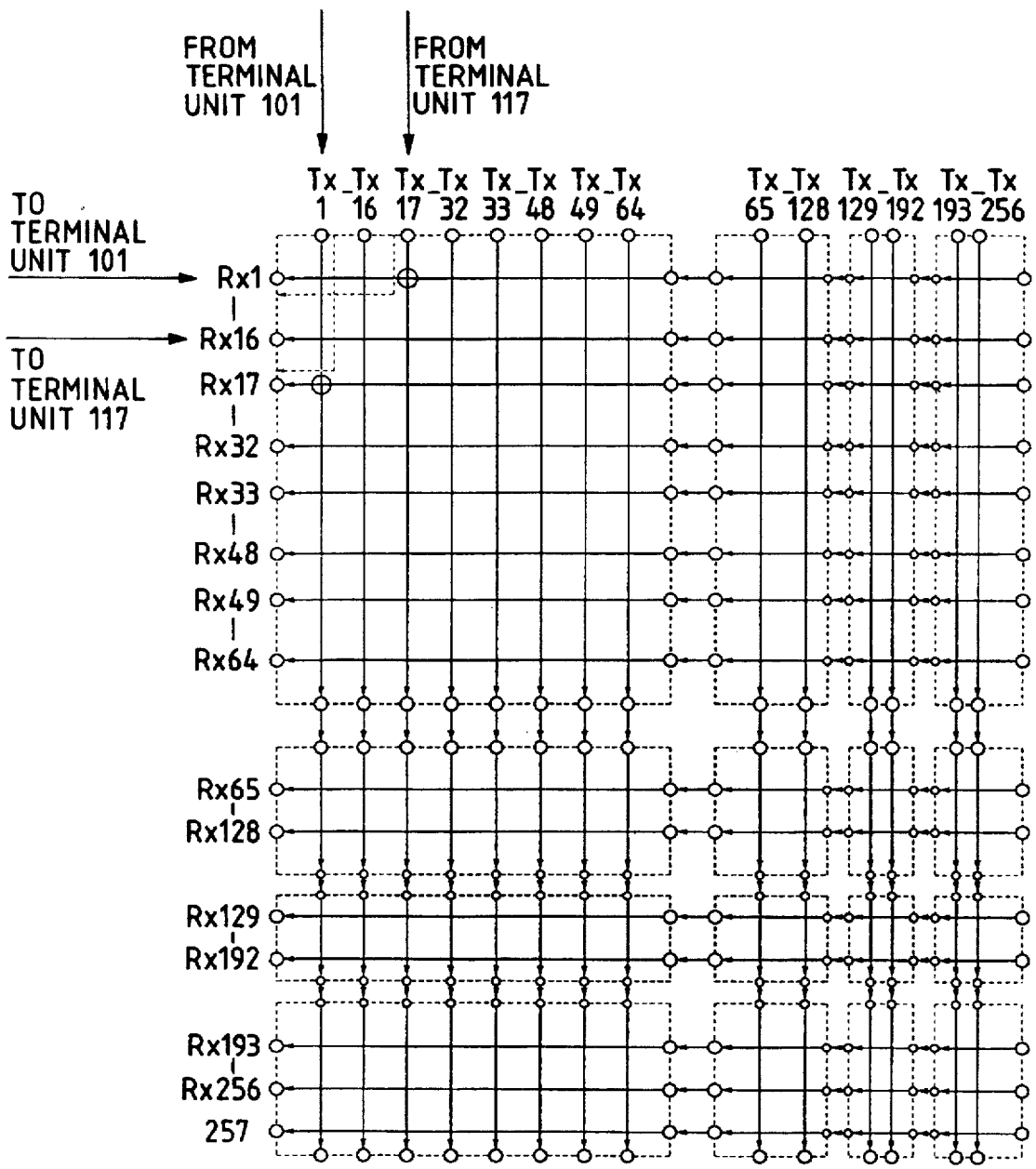
FIG. 8 is a view showing the detailed arrangement of a 256 CH cross point switch in FIG. 3.

FIG. 8 shows the detailed arrangement of the 256 CH cross point switch 506 in FIG. 7. One-to-one communication is performed between terminal units connected to each other at each cross point in FIG. 8 (each point indicated by "O" in FIG. 8, which is the intersection between each Tx line and each Rx line).

Figure 9:
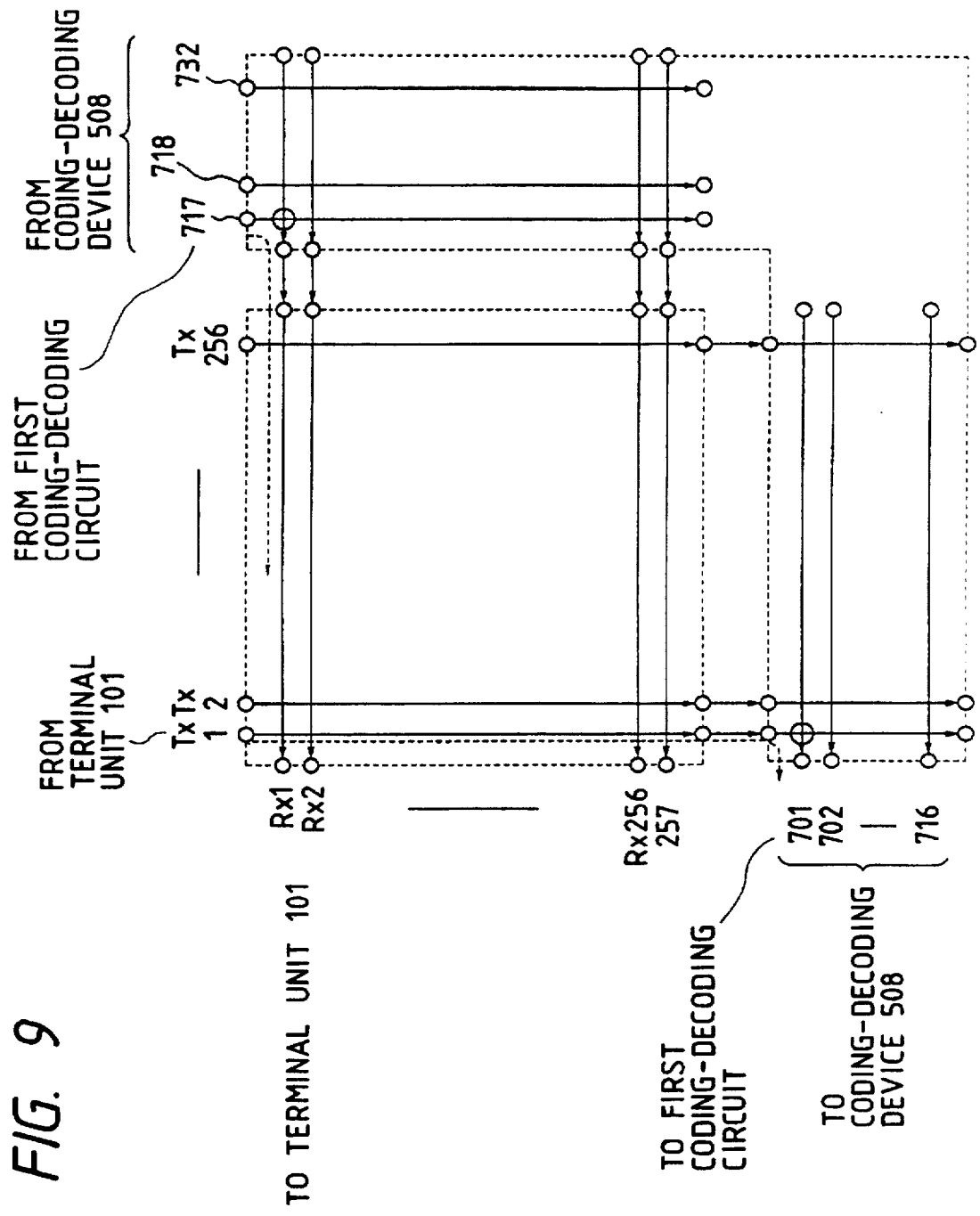
FIG. 9 is a view showing the detailed arrangement of a cross point switch for a coding-decoding device in FIG. 3.

FIG. 9 shows the detailed arrangement of the cross point switch 507 for the coding-decoding device in FIG. 7. Referring to FIG. 9, the cross point switch 507 includes 16 output terminals 701 to 716 for respectively outputting signals to be supplied to the coding unit of the coding-decoding device 508, and 16 input terminals 717 to 732 for respectively inputting signals supplied from the decoding unit of the coding-decoding device 508.

The operation of the video communication system as the first embodiment of the present invention will be described below with reference to FIGS. 3 to 12 and the flow charts in FIGS. 13 and 14.

Assume that in this embodiment, the extension terminal unit 101 outputs a call request to the terminal unit 117 while the power sources for all the constituent elements including the terminal units are in the ON state.

First of all, the operator of the extension terminal unit 101 operates the operation unit 215 to input the terminal number of the terminal unit 117 to be called and status information corresponding to the degree of urgency of the matter. When the operator then operates the communication start key, the system controller 216 causes the DC voltage supply circuit 212 to output a DC voltage to the transmission output terminal 214 (step S101 in FIG. 12).

The DC voltage output from the transmission output terminal 214 is sent to the 16 CH hub unit 165 to be applied to the input terminal 301 of the 16 CH hub unit 165.

In this embodiment, when the input switch 373 is operated at the time of, e.g., installation of the system, the system controller 372 assigns two different RF carrier frequencies of 32 different RF carrier frequencies, which are used for RF modulation/demodulation in the RF modulator units 333 to 349 and RF demodulator units 350 to 365, for each terminal unit.

The 16 CH hub unit 165 has the arrangement shown in FIG. 5. When the DC voltage is applied to the input terminal 301 in FIG. 5, the DC voltage is applied to the RF modulator 333 having an arrangement like the one shown in FIG. 10. As a result, a first transmission RF carrier (see Tx1 in FIG. 12) assigned to the extension terminal unit 101 in the above manner is output from the RF modulator 333.

The first transmission RF carrier signal is frequency-multiplexed with an RF signal output from another terminal unit by the RF mixer circuit 366, and is subjected to impedance matching in the 75 Ω driving amplifier 367. The resultant signal is then sent from the multiplex RF signal output terminal 368 to the 64 CH RF multiplexing device 174 through the coaxial cable 173.

As shown in FIG. 6, the 64 CH RF multiplexing device 174 is constituted by four 16 CH hub units. The 16 CH hub unit 402 in FIG. 6 corresponds to the 16 CH hub unit 165 in FIG. 3.

Figure 11:
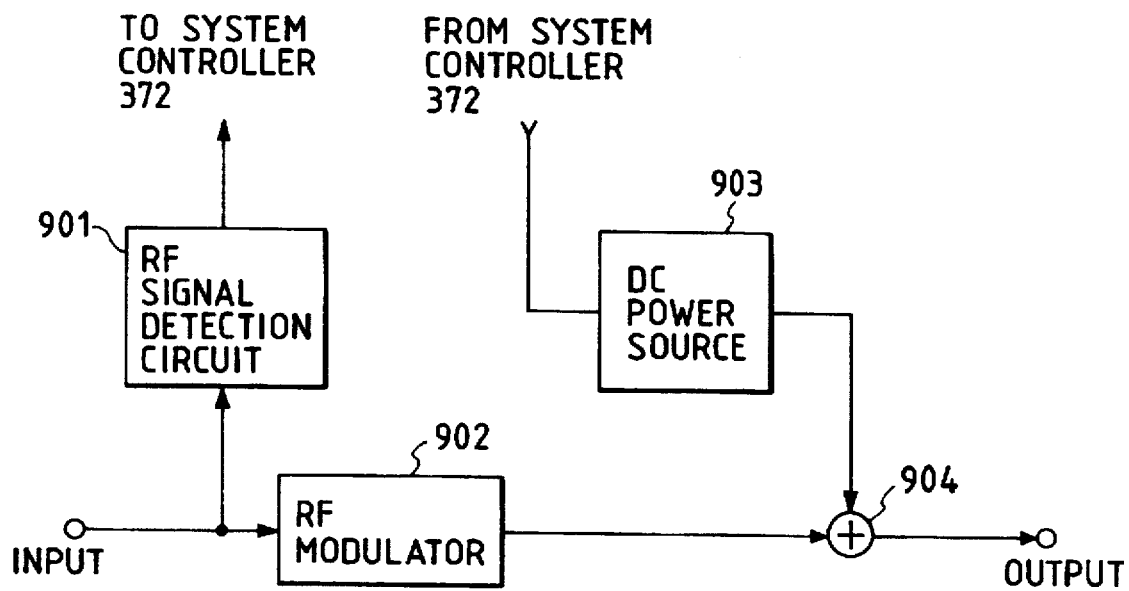
FIG. 11 is a block diagram showing the detailed arrangement of an RF modulator in FIG. 5.
Figure 12:
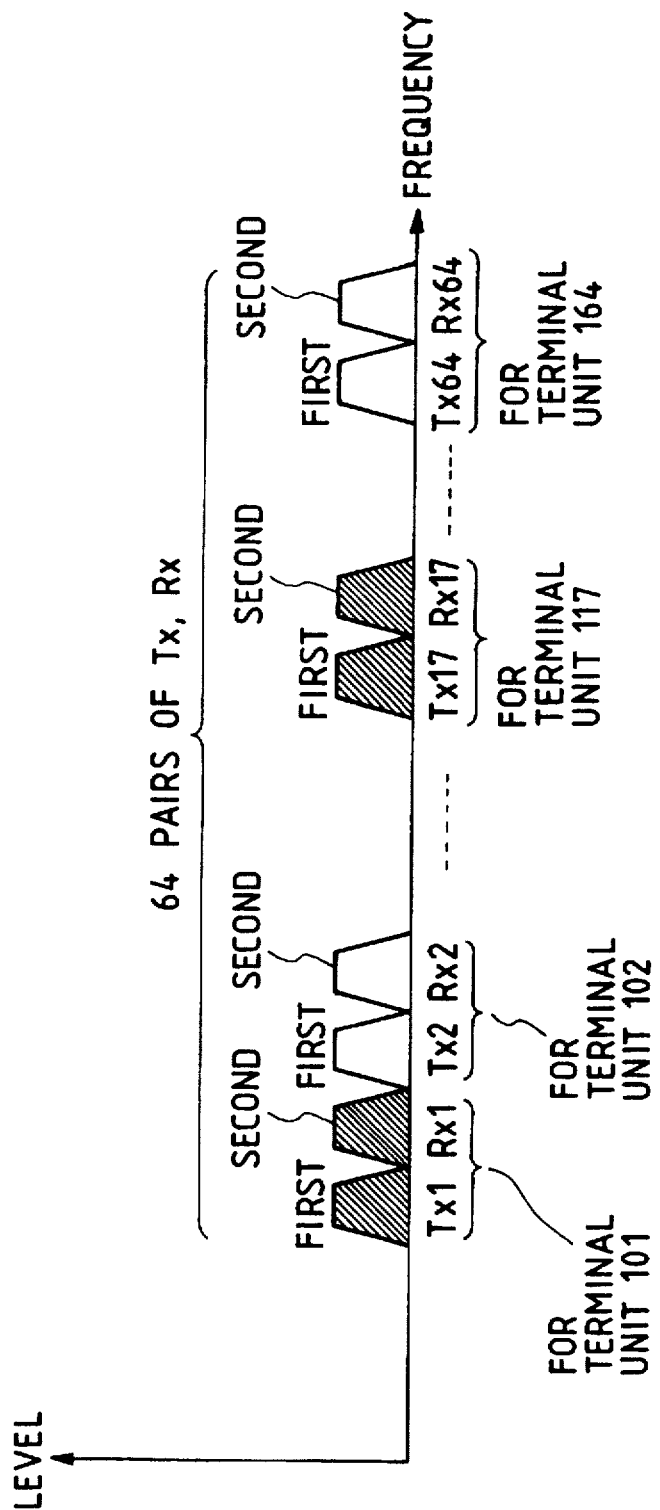
FIG. 12 is a chart showing RF bands assigned to the respective terminal units.

The RF demodulator unit 350 in FIG. 5 is assigned to the extension terminal unit 101 (FIG. 11 shows its detailed arrangement). The RF demodulator unit 350 detects, through an RF signal detection circuit 901, whether an RF signal is supplied from the extension terminal unit 101, and sends a detection signal indicating the detection result to the system controller 372.

If the detection signal indicating that an RF signal is supplied from the extension terminal unit 101 is output from the RF demodulator unit 350, the system controller 372 immediately outputs a command signal to the RF demodulator unit 350 to add a DC voltage. In response to the command signal from the system controller 372, the RF demodulator unit 350 causes an adder 904 to add a DC voltage generated by a DC voltage source 903 to a signal RF-demodulated by an RF demodulator 902, and outputs the resultant signal.

The DC voltage signal output from the RF demodulator unit 350 in the above manner is output to the video exchange 182 through the output terminal 317 in FIG. 5 and the input/output line 407 (T1) in FIG. 6, and is applied, as the input signal 501 in FIG. 7, to an input/output line assigned to the extension terminal unit 101 in the video exchange 182. The DC voltage component detection circuit 502 for the extension terminal unit 101 detects whether a DC voltage component is generated in the connected input/output line, and supplies the detection signal to the system controller 503 in the video exchange 182. With this operation, when the detection signal indicating the generation of the DC voltage component in the connected input/output line is supplied from the DC voltage component detection circuit 502 for the extension terminal unit 101 to the system controller 503, the video exchange 182 detects that a call request is output from the extension terminal unit 101 (step S102 in FIG. 13).

Figure 13:
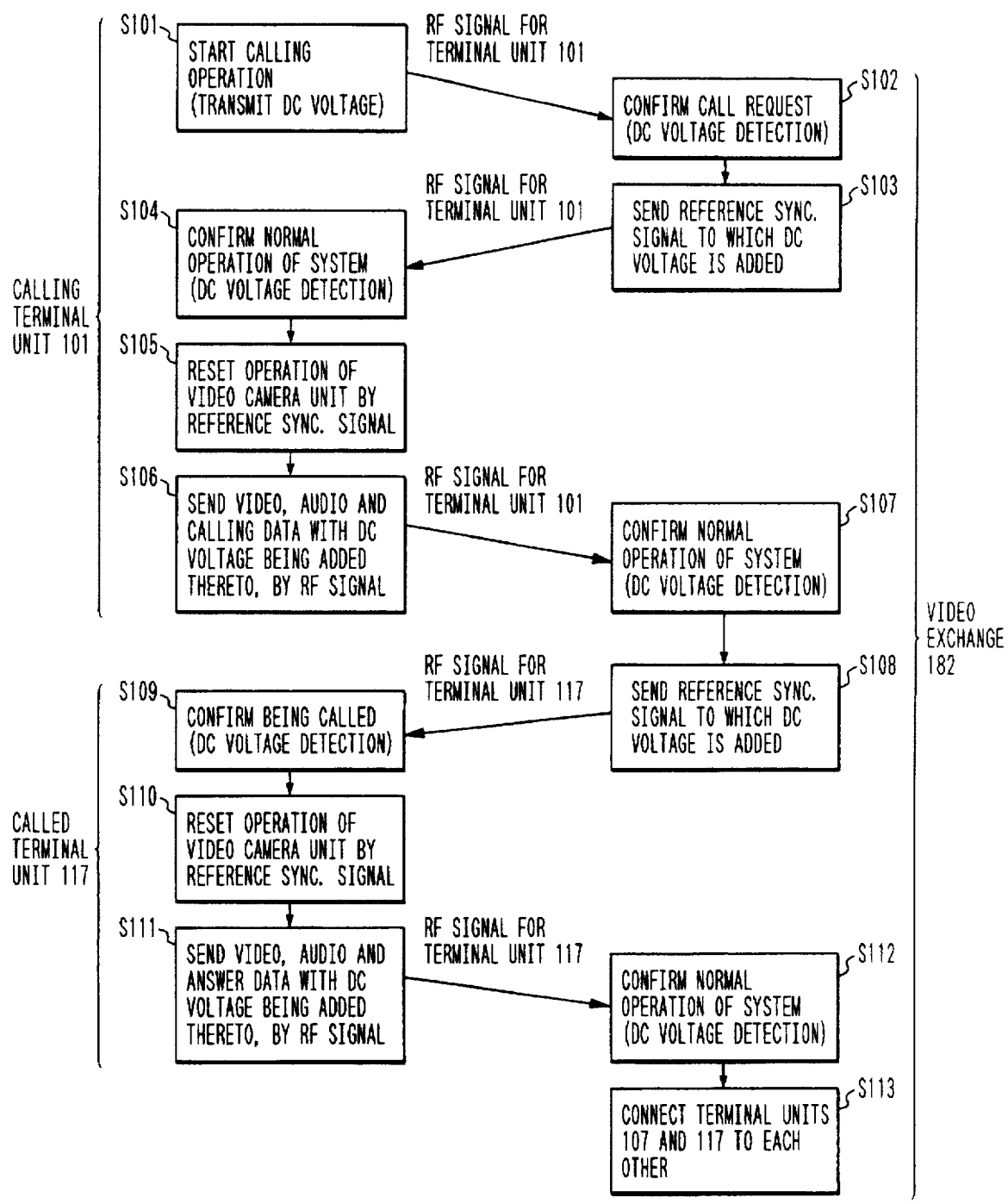
FIG. 13 is a flow chart showing a conversation establishing operation between extension terminal units in the video communication system as the first embodiment of the present invention.

Upon detection of the call request from the extension terminal unit 101 in the above manner, the system controller 503 controls the switch 510 to supply a reference sync. signal output from the reference sync. signal generator 505 to the DC voltage adder 511, and operates the DC voltage supply circuit 504 for the extension terminal unit 101 to apply a DC voltage output from the DC voltage supply circuit 504 to the DC voltage adder 511, thereby outputting the reference sync. signal to which the DC voltage is added to the output terminal for the extension terminal unit 101 (step S103 in FIG. 13).

The reference sync. signal to which the DC voltage is added in the above manner is input to the 16 CH hub unit 402 (corresponding to the 16 CH hub unit 165 in FIG. 3)

through one input/output line, of the group of input/output lines 407 for 16 channels in the 64 CH RF multiplexing device in FIG. 6, which corresponds to the extension terminal unit 101.

The 16 CH hub unit 402 has an arrangement like the one shown in FIG. 5. The reference sync. signal to which the applied DC voltage is added is supplied to the RF modulator 333 having an arrangement like the one shown in FIG. 10 through the input terminal 301. Of the supplied signal, the DC voltage component is supplied as power to an RF modulator 801 in the RF modulator 333 to operate the RF modulator 801, and the second reception RF carrier signal (see "Rx1" in FIG. 12) assigned to the extension terminal unit 101 in the above manner is modulated by the above reference sync. signal. The modulated signal is then supplied, as an RF signal to be output from the extension terminal unit 101, to the RF mixer circuit 366.

RF signals output from another terminal unit in the above manner are supplied to the RF mixer circuit 366. These plurality of types of RF signals are frequency-multiplexed by the RF mixer circuit 366. The resultant multiplex RF signal is output through the 75 Ω driving amplifier 367.

The multiplex RF signal output from the 75 Ω driving amplifier 367 in the above manner reaches the 16 CH hub unit 165 through the coaxial cable 169, the 16 CH hub unit 168, the coaxial cable 170, the 16 CH hub unit 167, the coaxial cable 171, the 16 CH hub unit 166, and the coaxial cable 172. The signal is then supplied from the multiplex RF signal input terminal 371 to the RF demodulator unit 350 for the extension terminal unit 101 through the buffer amplifier 370 in the 16 CH hub unit 165, as shown in FIG. 5.

Of the plurality of types of RF signals included in the multiplex RF signal supplied from the RF demodulator unit 350, the reference sync. signal of the RF signal formed by modulating the second reception RF carrier signal assigned to the extension terminal unit 101 using the above reference sync. signal in the above manner is RF-demodulated by the RF demodulator 902. In addition, a DC voltage generated by the DC voltage source 903 is added to the RF-demodulated reference sync. signal by the adder 904, and the resultant signal is output from the output terminal 317.

As shown in FIG. 4, the reference sync. signal to which the DC voltage is added and which is output from the output terminal 317, is input through the reception input terminal 219 of the extension terminal unit 101. In the above manner, the reference sync. signal generated in the video exchange 182 in response to the call request from the extension terminal unit 101 is supplied to the extension terminal unit 101.

The DC voltage component of the signal received by the extension terminal unit 101 through the reception input terminal 219 is a response from the video exchange 182 to the call request (i.e., outputting of the DC voltage signal through the transmission output terminal 214) from the extension terminal unit 101. Upon detection of the presence/absence of the DC voltage component of a received signal through the DC voltage detection circuit 232, the system controller 216 of the extension terminal unit 101 confirms the presence of a response from the video exchange 182, thereby confirming that the overall video communication system is normally operating (step 104 in FIG. 13).

As shown in FIG. 4, the extension terminal unit 101 causes the sync. separation circuit 233 to separate horizontal and vertical sync. signals from the reference sync. signal transmitted from the video exchange 182 in the above manner, and resets the SSG 208 by using the separated horizontal and vertical sync. signals. With this operation, the SSG 208 outputs various types of sync. signals synchronized with the above reference sync. signal. These signals include sync. signals for controlling the operations of the timing pulse generator 207, camera process circuit 205, and NTSC encoder 206 of the extension terminal unit 101, thereby causing the video camera unit of the extension terminal unit 101 to operate in synchronism with the reference sync. signal transmitted from the video exchange 182 (step S105 in FIG. 13).

After the video camera unit of the extension terminal unit 101 is made to operate in synchronism with the reference sync. signal transmitted from the video exchange 182, the system controller 216 of the extension terminal unit 101 sends calling data indicating, e.g., a called terminal number ("117" in this embodiment), set by operating the operation unit 215 in the above manner and call status information, and a calling terminal number ("101" in this embodiment), which are set by operating the operation unit 215 in the above manner, to the VIDS encoder 217. The VIDS encoder 217 encodes the calling data into a VIDS signal. The VIDS addition circuit 209 adds the VIDS signal to a video signal to its vertical blanking period. This video signal corresponds to an image picked up by the video camera unit of the extension terminal unit 101 and is output from the NTSC encoder 206. The resultant signal is supplied to the adder 210.

An audio signal output from the microphone 201 of the extension terminal unit 101 is amplified by the microphone amplifier 202 and is FM-modulated into a signal in a frequency band different from that of the video signal by the audio FM modulating circuit 203. The resultant audio FM signal is supplied to the adder 210. The adder 210 adds the video signal, to which the VIDS signal is added, to the audio FM signal to form an RF signal. The RF signal is supplied to the DC voltage adder 213 through the 75 Ω driving circuit 211. The DC voltage adder 213 then adds a DC voltage output from the DC voltage supply circuit 212 to the RF signal. The resultant signal is output to the 16 CH hub unit 165 through the transmission output terminal 214 (step S106 in FIG. 13).

Figure 10:
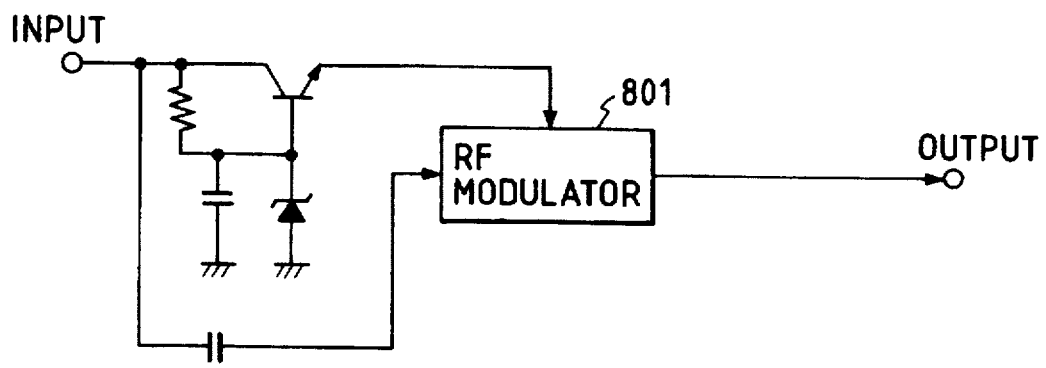
FIG. 10 is a view showing the detailed arrangement of an RF demodulator in FIG. 5.

In the 16 CH hub unit 165 (corresponding to the 16 CH hub unit 402 in FIG. 6) having the arrangement shown in FIG. 5, the RF signal to which the DC voltage is added is input to the RF modulator 333 having an arrangement like the one shown in FIG. 10 through the input terminal 301. The input DC voltage added to the RF signal is supplied as power to the RF modulator 801 to operate the RF modulator 801. As a result, the RF modulator 333 outputs the first transmission RF signal formed by RF-modulating the first transmission RF carrier signal (see "Tx1" in FIG. 12) assigned to the extension terminal unit 101 by using the input RF signal in the above manner. The first transmission RF signal is frequency-multiplexed with the transmission RF signal output from another terminal unit by the RF mixer circuit 366, and is subjected to impedance matching in the 75 Ω driving amplifier 367. The resultant signal is then sent from the multiplex RF signal output terminal 368 to the 64 CH RF multiplexing device 174 through the coaxial cable 173.

The first transmission RF signal sent to the 64 CH RF multiplexing device 174 is supplied to the first 16 CH hub unit 402 (corresponding to the 16 CH hub unit 165 in FIG. 3) of the four 16 CH hub units constituting the 64 CH RF multiplexing device. The signal is then RF-demodulated by the RF demodulator unit 350 in FIG. 5, which is assigned to the extension terminal unit 101, in the same manner as described above, and a DC voltage is added to the demodulated signal. The resultant signal is output to the video exchange 182 through the output terminal 317 and the input/output line 407 (T1) in FIG. 6.

As shown in FIG. 7, the RF signal to which the DC voltage is added is applied as the input signal 501 to the input/output line assigned to the extension terminal unit 101 in the video exchange 182. The DC voltage component detection circuit 502 for the extension terminal unit 101 detects whether a DC voltage component is generated in the connected input/output line. When a detection signal indicating that a DC voltage component is generated in the connected input/output line is supplied from the DC voltage component detection circuit 502 for the extension terminal unit 101 to the system controller 503 in the video exchange 182, the system controller 503 confirms the presence of a response from the extension terminal unit 101, thereby confirming that the overall video communication system is normally operating (step S107 in FIG. 13).

The video exchange 182 then supplies the RF signal sent from the extension terminal unit 101 to the 256 CH cross point switch 506 to be supplied to the VIDS decoder 509 connected to the 257th cross point output of the 256 CH cross point switch 506, thereby decoding the contents of the calling data indicated by the VIDS signal in the RF signal. When the result is sent to the system controller 503, a called terminal number is specified.

In this embodiment, since the called terminal number is "117", the system controller 503 sends the reference sync. signal to which the DC voltage is added to the 64 CH RF multiplexing device 174 to transmit the signal to the terminal unit 117 by controlling the switch 510 and the DC voltage supply circuit 504 for the terminal unit 117 (step S108 in FIG. 13).

In the 64 CH RF multiplexing device 174, an RF signal is formed by modulating the second reception RF carrier signal (see "Rx17" in FIG. 12) assigned to the terminal unit 117 using the reference sync. signal to which the DC voltage is added, which is supplied to the 64 CH RF multiplexing device 174, in the above manner. This RF signal is frequency-multiplexed with an RF signal output from another terminal unit by the RF mixer circuit 366. The resultant signal reaches the 16 CH hub unit 166 through the coaxial cable 169, the 16 CH hub unit 168, the coaxial cable 170, the 16 CH hub unit 167, and the coaxial cable 171, and is supplied to the RF demodulator unit for the terminal unit 117 in the 16 CH hub unit.

Of a plurality of types of RF signals included in the multiplex RF signal supplied to the RF demodulator unit, a reference sync. signal is demodulated from the RF signal formed by modulating the second reception carrier signal assigned to the terminal unit 117 using the above reference sync. signal in the same manner as described above, and a DC voltage is added to the demodulated reference sync. signal. The reference sync. signal to which the DC voltage is added is supplied to the reception input terminal of the terminal unit 117. When the DC voltage detection circuit of the terminal unit 117 detects whether a DC voltage component is present in the received signal, the system controller of the terminal unit 117 confirms the presence of a call request (i.e., being called from any one of the terminal units) (step S109 in FIG. 13).

As shown in FIG. 4, when a call request is generated as described above, the system controller of the terminal unit 117 immediately generates and sends a ringing tone signal to the power amplifier 226 to cause the speaker 227 to generate a ringing tone. In addition, the system controller causes the character generator 228 to generate a video signal indicating an image pattern or characters indicating a calling operation, and also causes the adder 229 to add a video signal indicating the image pattern or characters indicating the calling operation to the reference sync. signal transmitted from the video exchange 182. The system controller supplies the resultant signal to the liquid-crystal display driver 230 which has been operated before the generation of the above video signal, thereby causing the display unit 231 to display an image indicating the image pattern or characters indicating the calling operation.

The terminal unit 117 also supplies the reference sync. signal to which the DC voltage is added, and which is transmitted from the video exchange 182 in the above manner, to the sync. separation circuit through the low-pass filter 220. The sync. signal generator is reset by the horizontal and vertical sync. signals separated by the sync. separation circuit. With this operation, the sync. signal generator for generating various sync. signals for controlling the operations of the timing generator, camera process circuit, and the NTSC encoder of the terminal unit 117 outputs various sync. signals synchronized with the reference sync. signal, thereby operating the video camera unit of the terminal unit 117 in synchronism with the reference sync. signal transmitted from the video exchange 182 (step S110 in FIG. 13).

The operator of the terminal unit 117 recognizes a call from another terminal unit by checking the ringing tone generated by the speaker 227 or the image indicating the image pattern or characters indicating the calling operation. When the operator performs an answer operation by using the operation unit 215, answer data is generated by the system controller of the terminal unit 117. The generated answer data is supplied to the VIDS encoder 217. In addition, the video and audio mute states of the NTSC encoder 206 and the audio FM modulating circuit 203 are canceled.

The answer data generated by the system controller of the terminal unit 117 in the above manner is encoded into a VIDS signal by the VIDS encoder 217, and is added to the vertical blanking period of a video signal which corresponds to an image picked up by the video camera unit of the terminal unit 117 and which is output from the NTSC encoder 206 in the VIDS addition circuit 209. In addition, an audio FM signal formed by FM-modulating a signal output from the microphone of the terminal unit 117 and a DC voltage output from the DC voltage supply circuit are added. The resultant signal is sent to the video exchange 182 through the output terminal and the 64 CH RF multiplexing device 174 of the 16 CH hub unit 166 (step S111 in FIG. 13).

The RF modulator 333 of the 16 CH hub unit 166 operates by using the DC voltage added to the supplied signal as power. The RF modulator 333 outputs a first transmission RF signal formed by RF-modulating the first transmission RF carrier signal (see "Tx17" in FIG. 12) assigned to the terminal unit 117 with the input RF signal. The RF mixer circuit 366 frequency-multiplexes the first transmission RF signal with a transmission RF signal output from another terminal, and supplies the resultant signal to the 64 CH RF multiplexing device 174 through the 75 Ω driving amplifier 367 and the coaxial cable 173. The signal is then RF-demodulated by the RF demodulator unit assigned to the terminal unit 117 in the second 16 CH hub unit 403 of the four 16 CH hub units constituting the 64 CH RF multiplexing device. A DC voltage is added to the demodulated signal. The resultant signal is then output to the video exchange 182 through the output terminal and the input/output line 407 (T17).

As shown in FIG. 7, the video exchange 182 detects the DC voltage component added to the RF signal transmitted from the terminal unit 117 through the DC voltage component detection circuit 502. This detection result is sent to the system controller 503. As a result, the system controller 503 confirms the presence of a response from the terminal unit 117, and thus confirms that the overall video communication system is normally operating (step S112 in FIG. 13).

Upon confirming that the overall video communication system is normally operating, the system controller 503 supplies the RF signal sent from the terminal unit 117 to the 256 CH cross point switch 506 to supply the RF signal to the VIDS decoder 509 connected to the 257th cross point output of the 256 CH cross point switch 506, thereby decoding the contents of answer data indicated by the VIDS signal in the RF signal. The decoding result is sent to the system controller 503. If the decoding result indicates the answer data, the system controller 503 performs exchange control through the 256 CH cross point switch 506.

More specifically, the video exchange 182 performs control to switch the switch 510, which has been connected to send reference sync. signals to the extension terminal unit 101 as the calling terminal and the terminal unit 117 as the called terminal in this embodiment, to the 256 CH cross point switch 506 side. In addition, the video exchange 182 performs control to connect the cross point between the extension terminal unit 101 and the terminal unit 117 in the 256 CH cross point switch 506 (i.e., the intersection between a Tx line and an Rx line, which is indicated by "○" in FIG. 8). With this operation, the extension terminal unit 101 and the terminal unit 117 are connected to each other in such a manner that RF signals transmitted from the extension terminal unit 101 and the terminal unit 117 are respectively exchanged between these extension terminal units (step S113 in FIG. 13).

A communication channel is established between the two terminal units in this manner. RF signals transmitted through the communication channel reach the respective terminal units through the 64 CH RF multiplexing device 174.

As shown in FIG. 4, in each terminal unit, a video signal extracted from an RF signal input through the input terminal by the low-pass filter 220 is supplied to the liquid-crystal display driver 230 through the adder 229 to be displayed as a moving image on the display unit 231. Meanwhile, an audio FM signal extracted by the bandpass filter 223 is FM-demodulated by the audio FM demodulator 224. Thereafter, in order to prevent oscillation, the demodulated signal is subtracted from the audio signal generated by the microphone of the self terminal unit in the echo canceler 225. The resultant signal is supplied to the power amplifier 226 to cause the speaker 227 to generate speech corresponding to the audio signal. With this operation, video communication can be performed between the terminal units by means of moving images and speech.

Assume that after a communication channel is established between the two terminal units, data other than calling data and answer data need to be communicated through the communication channel. In this case, data from a personal computer or the like is received by the system controller in the terminal unit on the transmission side through the data I/O interface 218 in FIG. 4, and the received data is encoded into a VIDS signal by the VIDS encoder. With this operation, the data is transmitted together with video and audio signals, as in the case of the calling data and the answer data, and is decoded by the VIDS decoder of the terminal unit on the reception side, thereby allowing communication of data between the two terminal units. As is apparent, such communication of data has no influence on conversation by means of images and speech.

Figure 14:
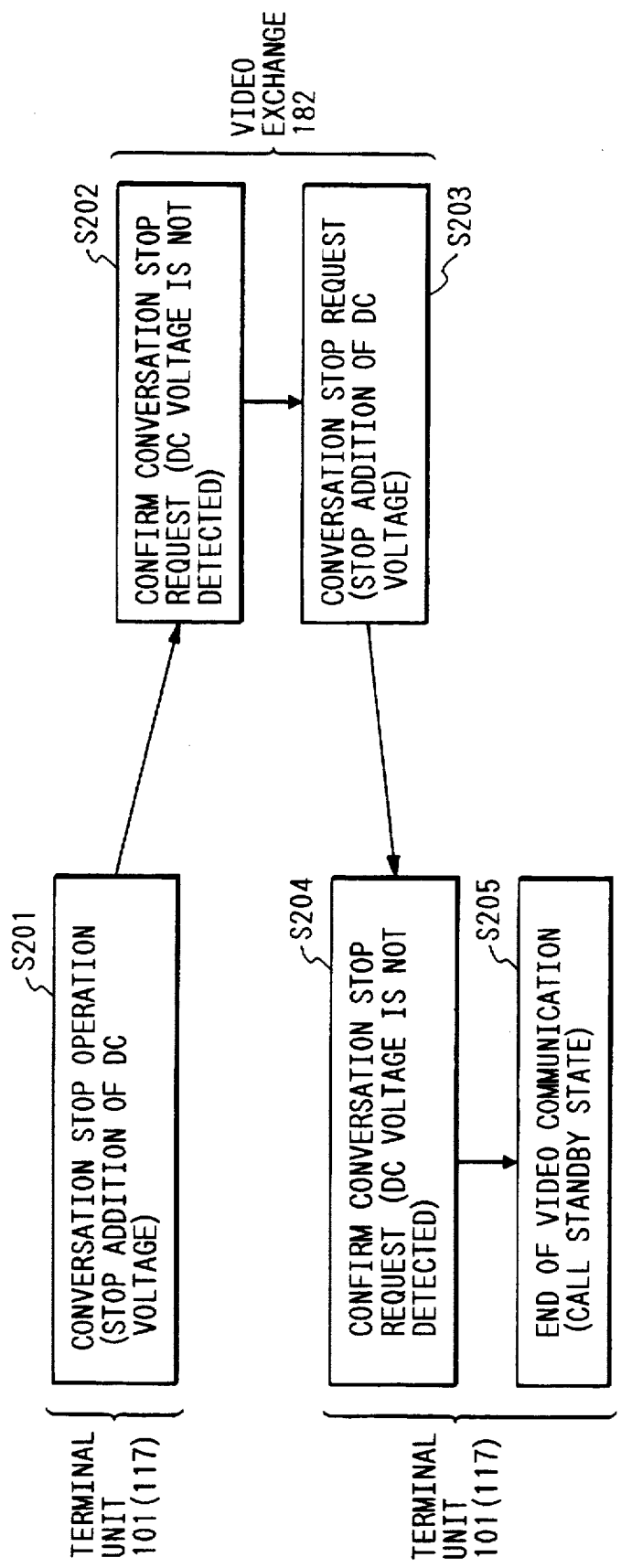
FIG. 14 is a flow chart showing a conversation stop operation between extension terminal units in the video communication system as the first embodiment of the present invention.

When the above video communication is to be stopped, a conversation stop operation is performed by operating the operation unit of either one of the terminal units to inhibit addition of a DC voltage to a signal to be transmitted (step S201 in FIG. 14). With this operation, since the DC voltage component detection circuits 502 of the video exchange 182 detects no DC voltage component in the signal to be transmitted from the extension terminal unit 101 or 117 (step S202 in FIG. 14), the system controller 503 of the video exchange 182 does not operate the DC voltage supply circuits 504 for the terminal units 101 and 117 (step S203 in FIG. 14), thereby inhibiting addition of DC voltage components to signals to be transmitted from the video exchange 182 to the terminal units 101 and 117. With this operation, since no DC voltages are detected in the RF modulator units for the terminal units 101 and 117 in the 16 CH hub units 402 and 403 of the four 16 CH hub units constituting the 64 CH RF multiplexing device 174, no power is supplied to the RF modulators, thus stopping the operations of the RF modulators. As a result, the supply of RF signals to the terminal units 101 and 107 is stopped (step S204 in FIG. 14).

When the supply of RF signals is stopped in the above manner, the RF demodulator units 350 for the terminal units 101 and 117 in the 16 CH hub units 402 and 403 are set so as not to add DC voltage components. With this operation, no DC voltage components are added to signals supplied to the reception input terminals 219 of the terminal units 101 and 117. The DC voltage detection circuits 232 of the terminal units 101 and 117 therefore detect omission of the DC voltage components. As a result, the system controllers 216 of the terminal units 101 and 117 restore the operations of the terminal units to their initial states in accordance with the notification results to set a call standby state, thereby completing the video communication (step S205 in FIG. 14).

In the above description, in the video communication system as an embodiment of the present invention, a communication channel is established between the terminal units 101 and 117 by using an extension coaxial cable, and communication is performed through the communication channel, thereby performing video communication. The operation of an embodiment in which an extension terminal unit is connected to an external terminal unit by using an ISDN to perform video communication will be described below with reference to the flow chart in FIG. 15.

A case wherein an extension terminal unit calls an external terminal unit to perform conversation will be described first.

In this embodiment, the extension terminal unit 101 as the calling terminal performs the same operation as the conversation establishing operation (steps S101 to S107 in FIG. 13) between extension terminal un its, but the called terminal number in calling data in this case is an outside line number.

More specifically, upon detecting called terminal data indicating an outside line in response to the operation in step S108 in FIG. 13, the system controller 503 of the video exchange 182 in FIG. 7 searches the coding-decoding device 508 (corresponding to the coding-decoding device 184 in FIG. 3), which is constituted by, e.g., 16 coding-decoding circuits and has ISDN input/output (I/O) interfaces for the respective coding-decoding circuits, for an unused coding/decoding circuit.

Figure 15:
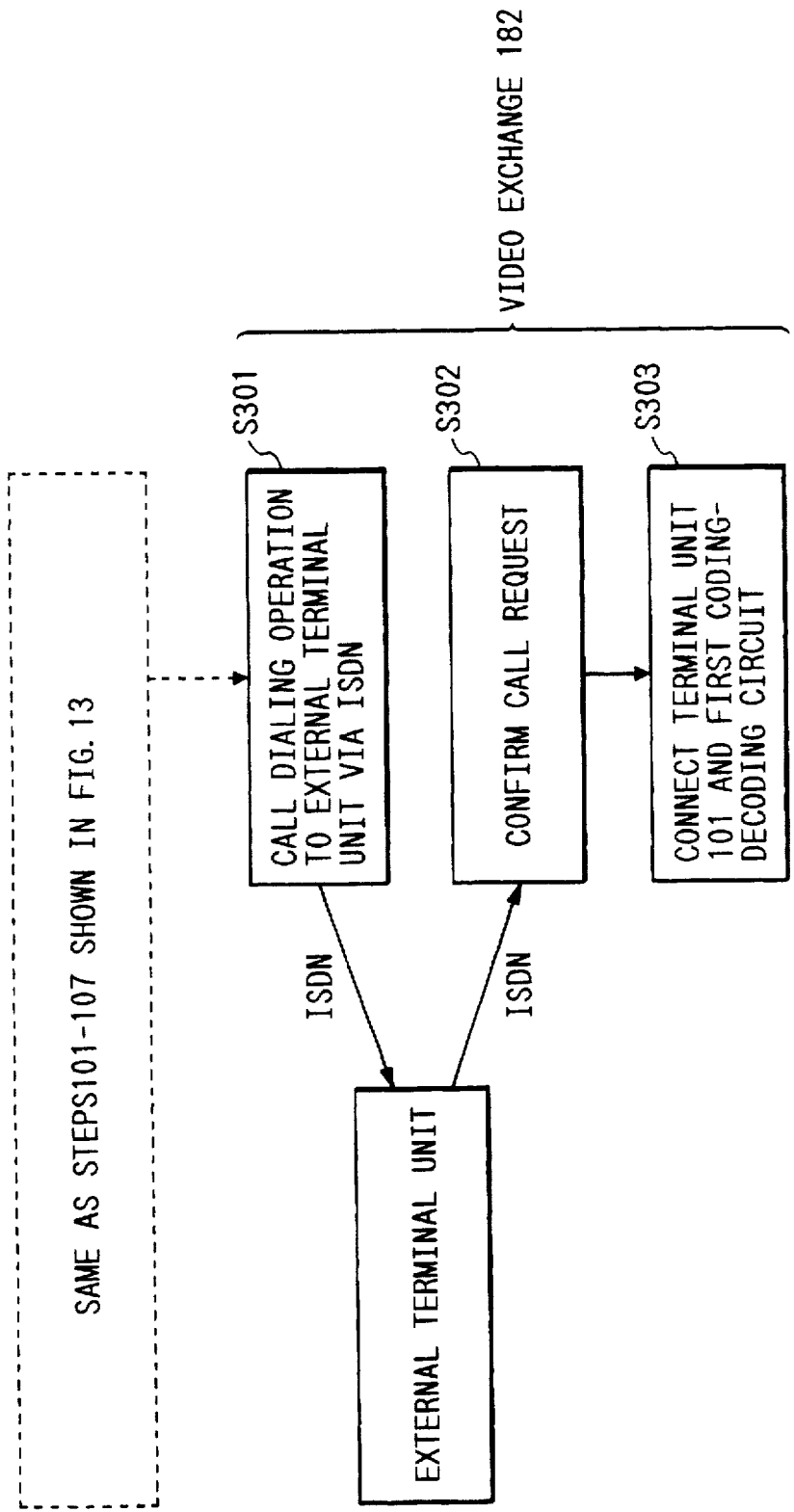
FIG. 15 is a flow chart showing a video communication operation between an extension terminal unit and an external terminal unit in the video communication system as the first embodiment of the present invention.

If, for example, the first coding-decoding circuit is in an unused state, the system controller 503 controls the ISDN I/O interface corresponding to the first coding-decoding circuit in the coding/decoding device so as to perform a call dialing operation with respect to the external terminal unit corresponding to the outside line number through the ISDN 185 (step S301 in FIG. 15).

When a communication channel is established between the calling extension terminal unit and the called external terminal unit, the ISDN I/O interface provides this information to the system controller 503 of the video exchange 182 (see step S302 in FIG. 15). The system controller 503 then controls the 256 CH cross point switch 506 and the cross point switch 507 (i.e., the intersections between each Tx line and each Rx line in the 256 CH cross point switch 506 and the connection terminals 701 and 717 in the cross point switch 507, which are indicated by "○" in FIG. 9), and connects the extension terminal unit 101 to the first coding/decoding circuit (see step S303 in FIG. 15), as shown in FIG. 9. With this operation, video communication between the extension terminal unit 101 and the external terminal unit can be performed.

When the extension terminal unit 101 on the premises is to perform a conversation stop operation, the extension terminal unit 101 detects, through the video exchange 182, that no DC voltage is added, and transmits control data for stopping the conversation to the external terminal unit through the ISDN I/O interface, thereby restoring the operation of the external terminal unit to its initial state and setting a call standby state. In addition, the system controller 503 of the video exchange 182 inhibits addition of a DC voltage to a signal to be transmitted to the extension terminal unit 101. With this operation, the operation of the extension terminal unit 101 on the premises is restored to its initial state, and a call standby state is set, thus terminating the video communication.

When the external terminal unit is to perform a conversation stop operation, the external terminal unit sends information data indicating designation of a conversation stop operation to the system controller 503 of the video exchange 182 through the ISDN I/O interface. The system controller 503 then inhibits addition of a DC voltage to a signal to be transmitted to the extension terminal unit 101 on the premises. As a result, the operation of the extension terminal unit 101 in the private network is restored to the initial state, and a call standby state is set, thereby completing the video communication.

A case wherein an external terminal unit calls an extension terminal unit to perform conversation will be described next.

Assume that an external terminal unit transmits calling data to the video exchange 182 through the ISDN I/O interface to call the first coding-decoding circuit in the coding-decoding device 184 connected to the video exchange 182, and the circuit is connected to the external terminal unit. In this case, the calling data transmitted from the external terminal unit is sent to the system controller 503 in the video exchange 182. When data communication between the external terminal unit and the system controller 503 is then established, the external terminal unit transmits called terminal data indicating the outside line number "117" for calling the terminal unit 117 on the premises. This data is sent to the system controller 503 through the ISDN I/O interface.

The system controller 503 in the video exchange 182 executes the communication channel establishing operation (steps S108 to S113 in FIG. 13) as that between extension terminal units, and connects the terminal unit 117 to the first coding-decoding circuit to allow video communication between the external terminal unit and the terminal unit 117.

A conversation stop operation is the same as the operation of calling an external terminal unit from the extension terminal unit 101 on the premises, and hence a description thereof will be omitted.

When an extension terminal unit and an external terminal unit are to be connected through the ISDN to perform video communication in the above manner, since limitations are imposed on this operation depending on the transmission band of the ISDN, the information amounts of video and audio signals must be decreased. As a result, the image quality and the sound quality deteriorate. However, video communication can be performed between the extension terminal unit and the external terminal unit.

As described above, according to the video communication system as an embodiment of the present invention, private branch communication using images and speech can be realized with an inexpensive arrangement without compressing the video and audio information amounts. Since compression of the information amounts is not performed, video communication with high image quality and high sound quality can be attained.

In this system, a transmission frequency band a reception frequency band are assigned to each terminal unit, and signals which include video and audio data and data and are output from the respective terminal units are frequency-multiplexed to be transmitted to a communication channel. For this reason, pieces of information output from a plurality of terminal units can be sent by multiplex transmission. In addition, since the terminal units, the repeaters, and the exchange can be connected through coaxial cables in the form of a loop, installation of the devices can be easily performed at low cost.

In this system, the operation flow charts for line connection and communication in the terminal units, the repeaters, and the exchange are based on the following operations, e.g., adding a DC voltage to a signal to be transmitted in a terminal unit which is to perform transmission; detecting the presence/absence of a DC voltage component in a signal sent to a terminal unit which is to perform reception; and designating a called terminal unit by using a data signal added to the vertical blanking period of a video signal to be transmitted. The system can therefore be realized with an inexpensive arrangement in the form of hardware.

In addition, in this system, since the image pickup unit of each terminal unit operates in synchronism with a reference sync. signal transmitted from the exchange, disturbance of synchronization in displayed images and a deterioration in image quality due to crosstalk of sync. signals can be suppressed in performing communication channel connection between the terminal units.

Furthermore, in this system, in addition to private branch communication, communication of video and audio data with an external terminal unit can be performed by using a line such as an ISDN.

As described above, according to this embodiment, there is provided an inexpensive video communication system which can solve the conventional problems, and suppresses a deterioration in image quality and sound quality.

The second embodiment of the present invention will be described below.

Figure 16:
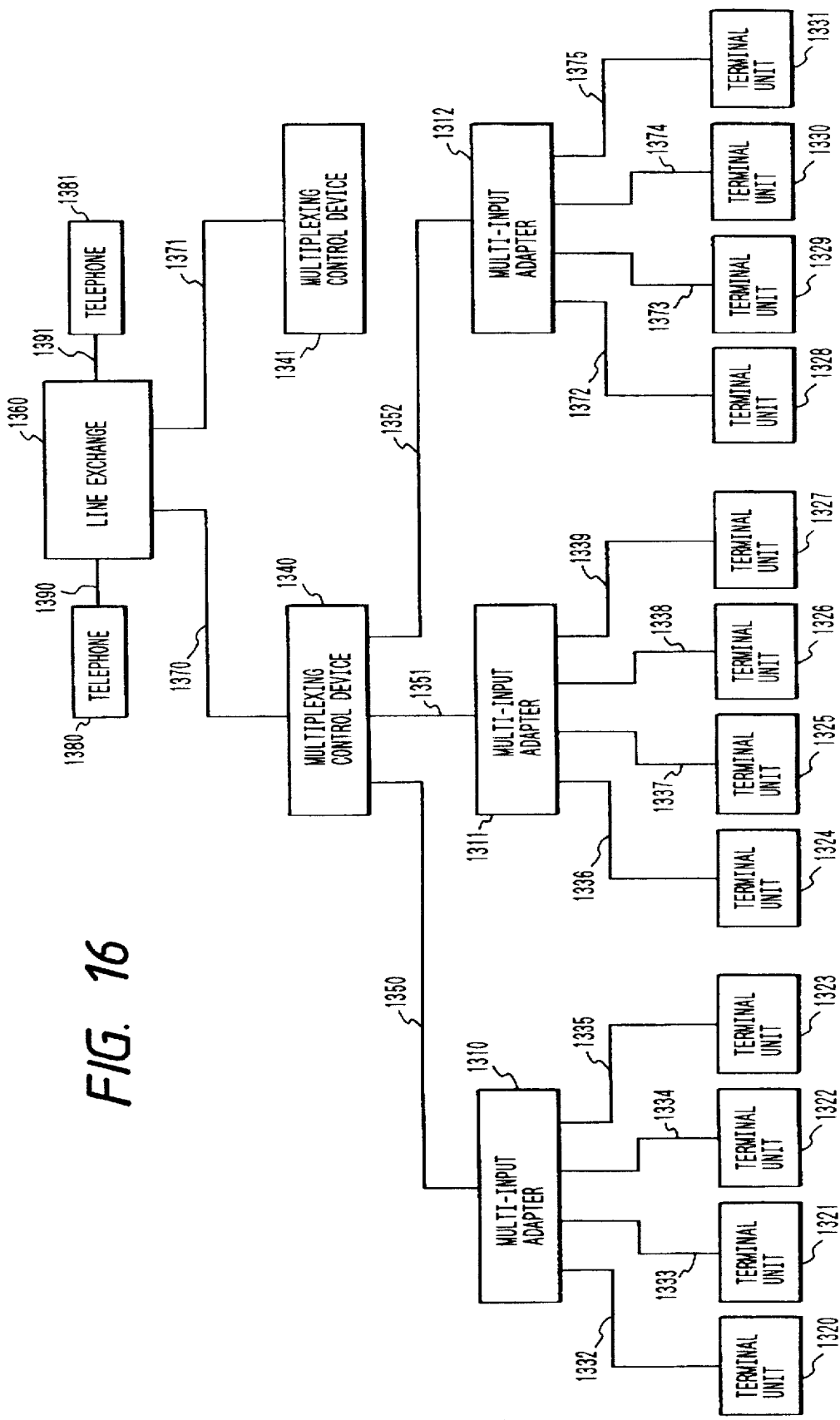
FIG. 16 is a block diagram showing the arrangement of a network in a television conference system as the second embodiment of the present invention.

FIG. 16 shows the arrangement of a network in a television conference system according to an embodiment of the present invention. Referring to FIG. 16, this arrangement includes multi-input adapters 1310 to 1312, terminal units 1320 to 1331 for television conferences, communication lines 1372 to 1375 for exchanging video data, audio data, and information data with each terminal unit, multiplexing control devices 1340 and 1341, communication lines 1350 to 1352 for exchanging multiplex data with the multi-input adapters 1310 to 1312, a line exchange 1360 for exchanging lines, communication lines 1370 and 1371 for exchanging multiplex data with multiplexing control devices, analog telephones 1380 and 1381, and analog telephone lines 1390 and 1391.

Figure 17:
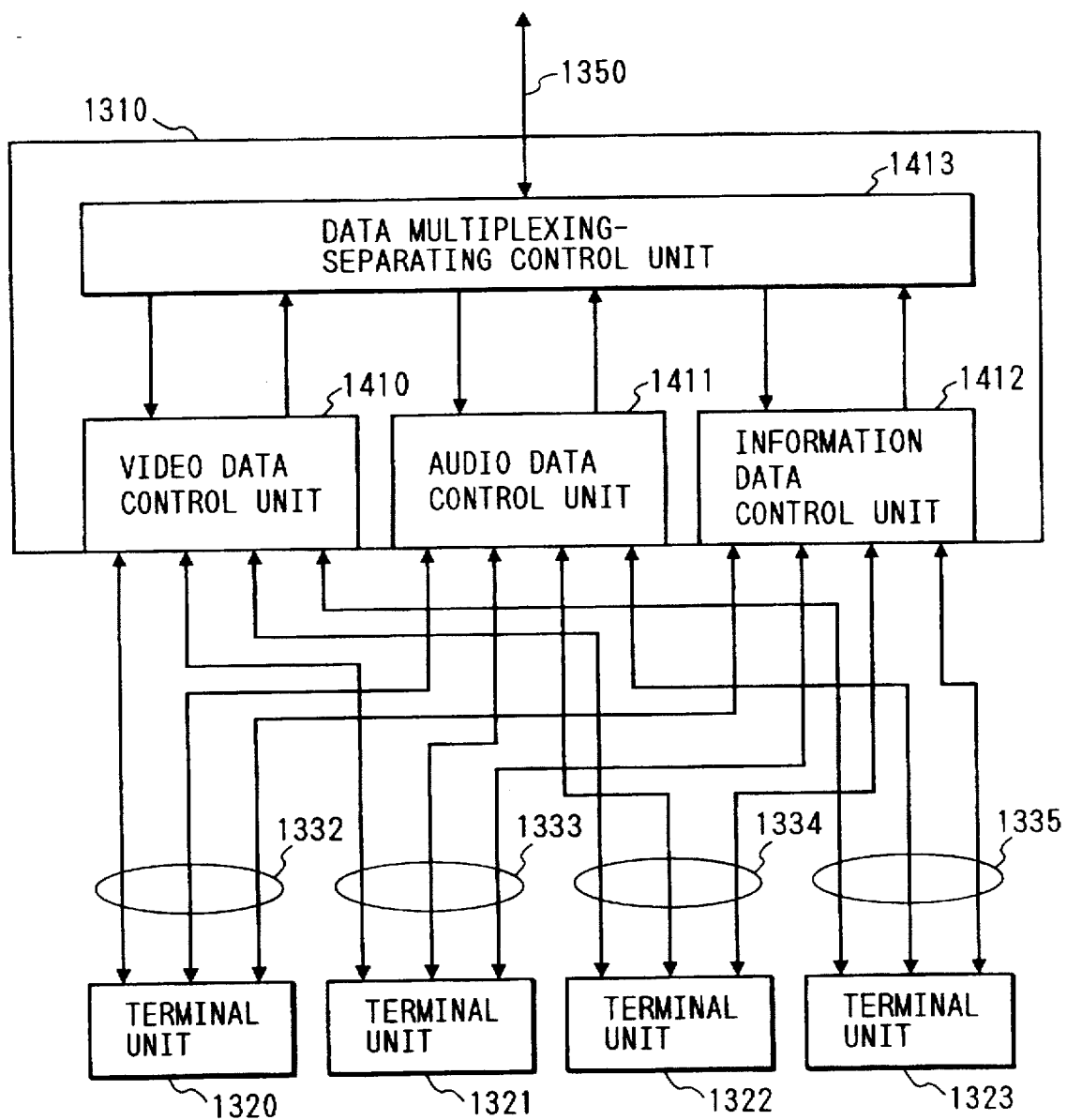
FIG. 17 is a block diagram showing the arrangement of a multi-input adapter in FIG. 16.

FIG. 17 shows the arrangement of the multi-input adapter 1310 in FIG. 16. Referring to FIG. 17, the multi-input adapter 1310 includes a video data control unit 1410 for processing video data transmitted from the terminal units 1320 to 1323, and performing switching control of video data to be transmitted to the terminal units 1320 to 1323, an audio data control unit 1411 for adding audio data transmitted from the terminal units 1320 to 1323 and performing switching control of information to be transmitted to the terminal units 1320 to 1323, an information data control unit 1412 for processing information data transmitted from the terminal units 1320 to 1323 and performing switching control of information data to be transmitted to the terminal units 1320 to 1323, and a data multiplexing-separating control unit 1413 for multiplexing a plurality of types of input data transmitted from the video data control unit 1410, the audio data control unit 1411, and the information data control unit 1412, and outputting the resultant data to the communication line 1350. In addition, the data multiplexing-separating control unit 1413 separates a plurality of types of data, e.g., video data, audio data, and information data, from the multiplex data transmitted through the communication line 1350, and transmits the resultant data to the terminal units 1320 to 1323.

Figure 18:
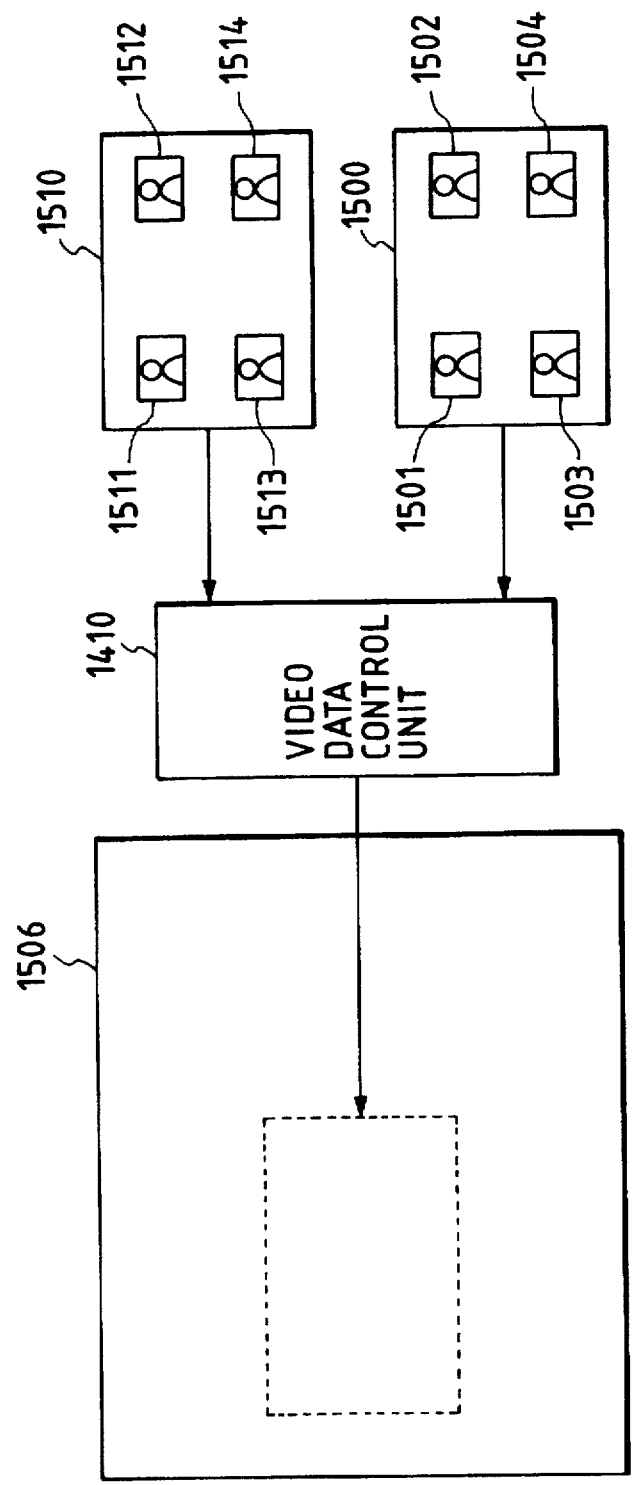
FIG. 18 is a block diagram showing images to be displayed on the display screen of the display unit of each terminal unit.

FIG. 18 shows images displayed on the display screen of the display unit of each terminal unit. Video data transmitted from the terminal units 1320 to 1323 as shown in FIG. 16 are synthesized by the video data control unit 1410 in the multi-input adapter 1310 to form multi-video data, as shown in FIG. 17. This multi-video data is output to the terminal units 1320 to 1323 and is also output to the data multiplexing-separating control unit 1413.

Referring to FIG. 18, an image 1500 indicated by the multi-video data formed by the video data control unit 1410 in the multi-input adapter 1310 in the above manner includes video data 1501 transmitted from the terminal unit 1320, video data 1502 transmitted from the terminal unit 1321, video data 1503 transmitted from the terminal unit 1322, and video data 1504 transmitted from the terminal unit 1323. The video data control unit 1410 supplies the multi-video data formed in this manner to the terminal units 1320 to 1323 through the communication lines 1332 to 1335.

Referring to FIG. 18, an image 1510 indicated by the multi-video data formed in the multi-input adapter 1311 includes video data 1511 transmitted from the terminal unit 1324, video data 1512 transmitted from the terminal unit 1325, video data 1513 transmitted from the terminal unit 1326, and video data 1514 transmitted from the terminal unit 1327. The multi-video data formed in the multi-input adapter 1311 in this manner is separated from multiplex data supplied through the communication line 1350 by the data multiplexing-separating control unit 1413, and is supplied to the terminal units 1320 to 1323 by the video data control unit 1410.

Referring to FIG. 18, an image 1506 indicated by the video data transmitted from the video data control unit 1410 to the terminal unit 1320 is displayed on the display screen of the display unit of the terminal unit 1320. A similar display operation is performed in each of the remaining terminal units 1321 to 1327.

Figure 19:
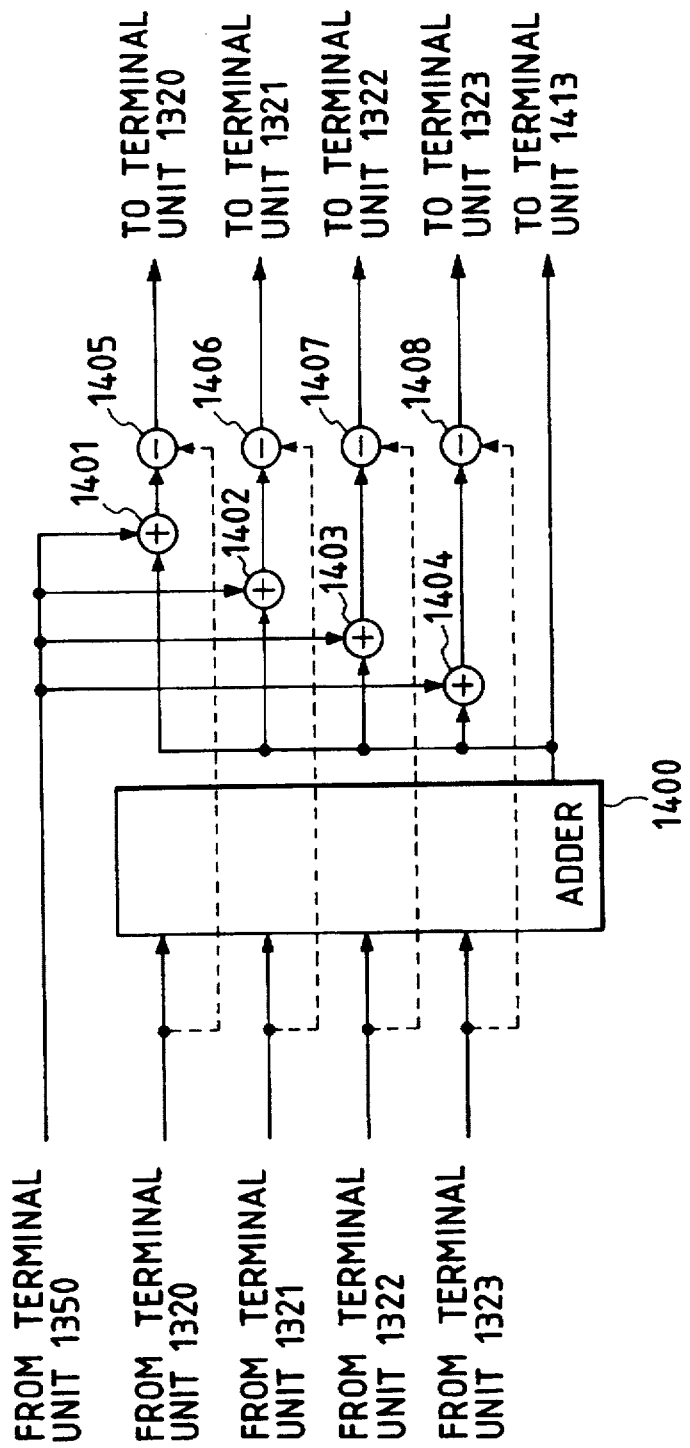
FIG. 19 is a view showing the arrangement of an audio data control unit in FIG. 17.
Figure 20:
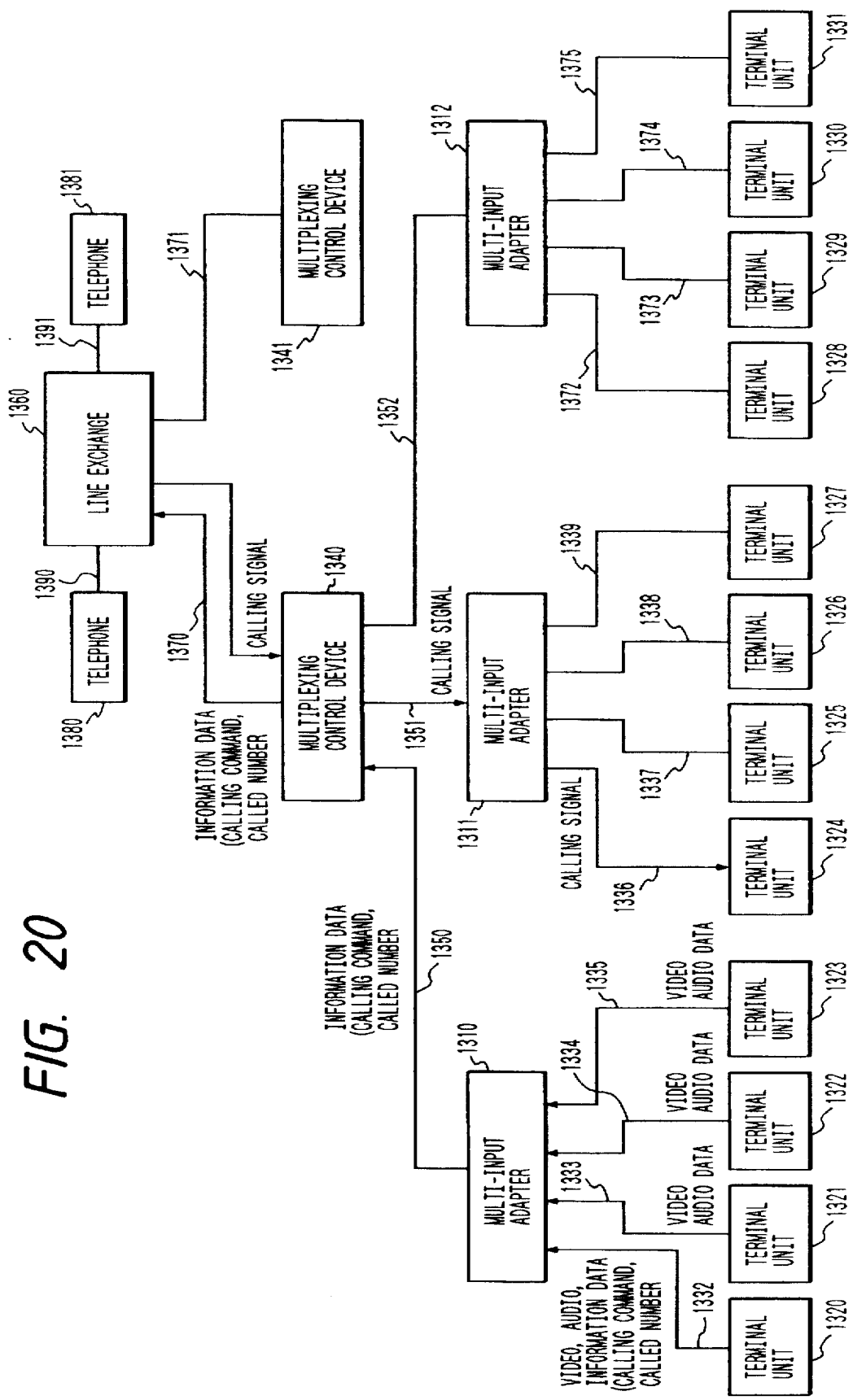
FIG. 20 is a block diagram showing the flow of data to be communicated in accordance with a procedure for a case wherein a given terminal unit calls another terminal unit.
Figure 21:
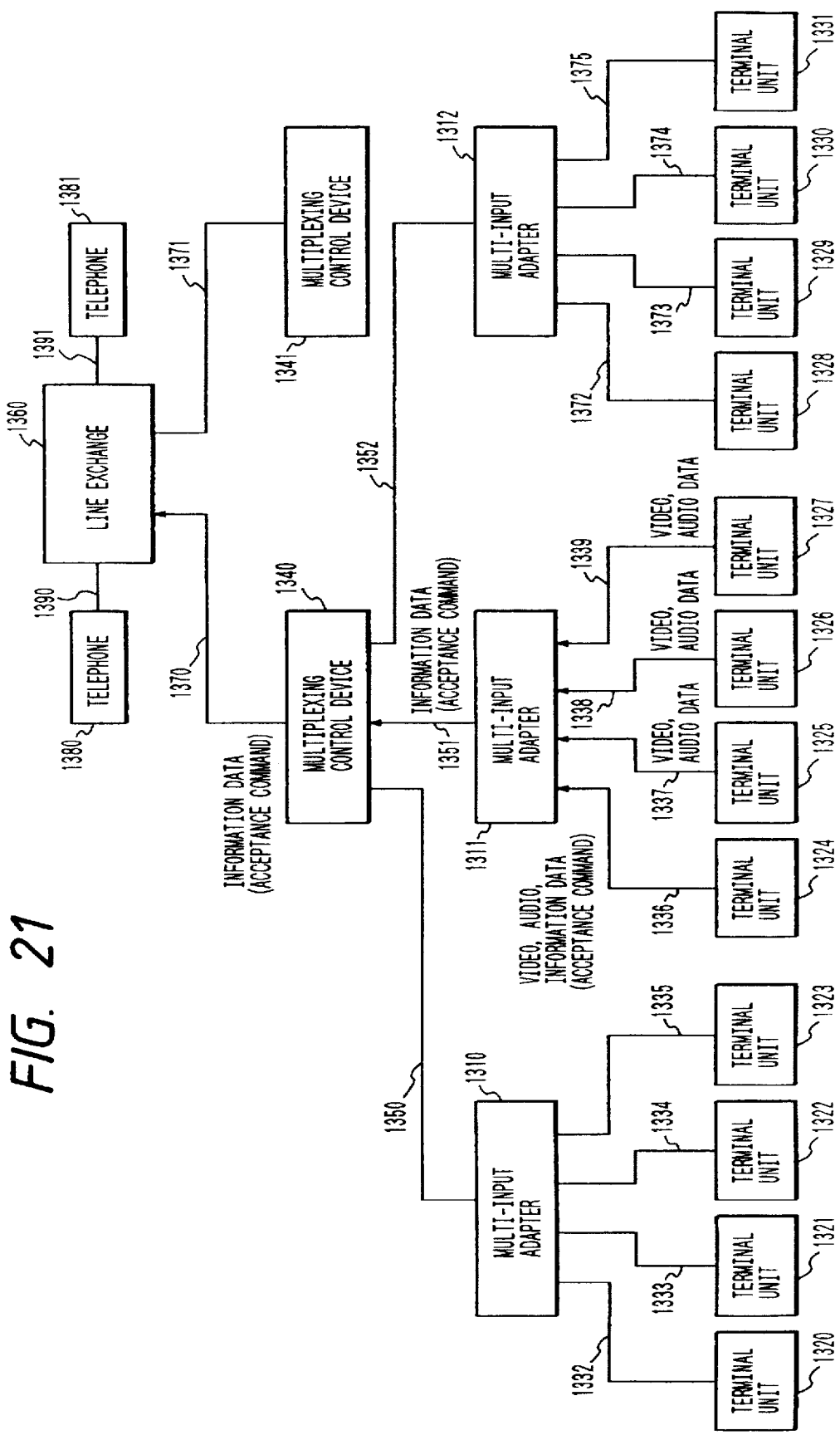
FIG. 21 is a block diagram showing the flow of data to be communicated in accordance with a procedure for a case wherein a terminal unit answers a call from a line exchange.
Figure 22:
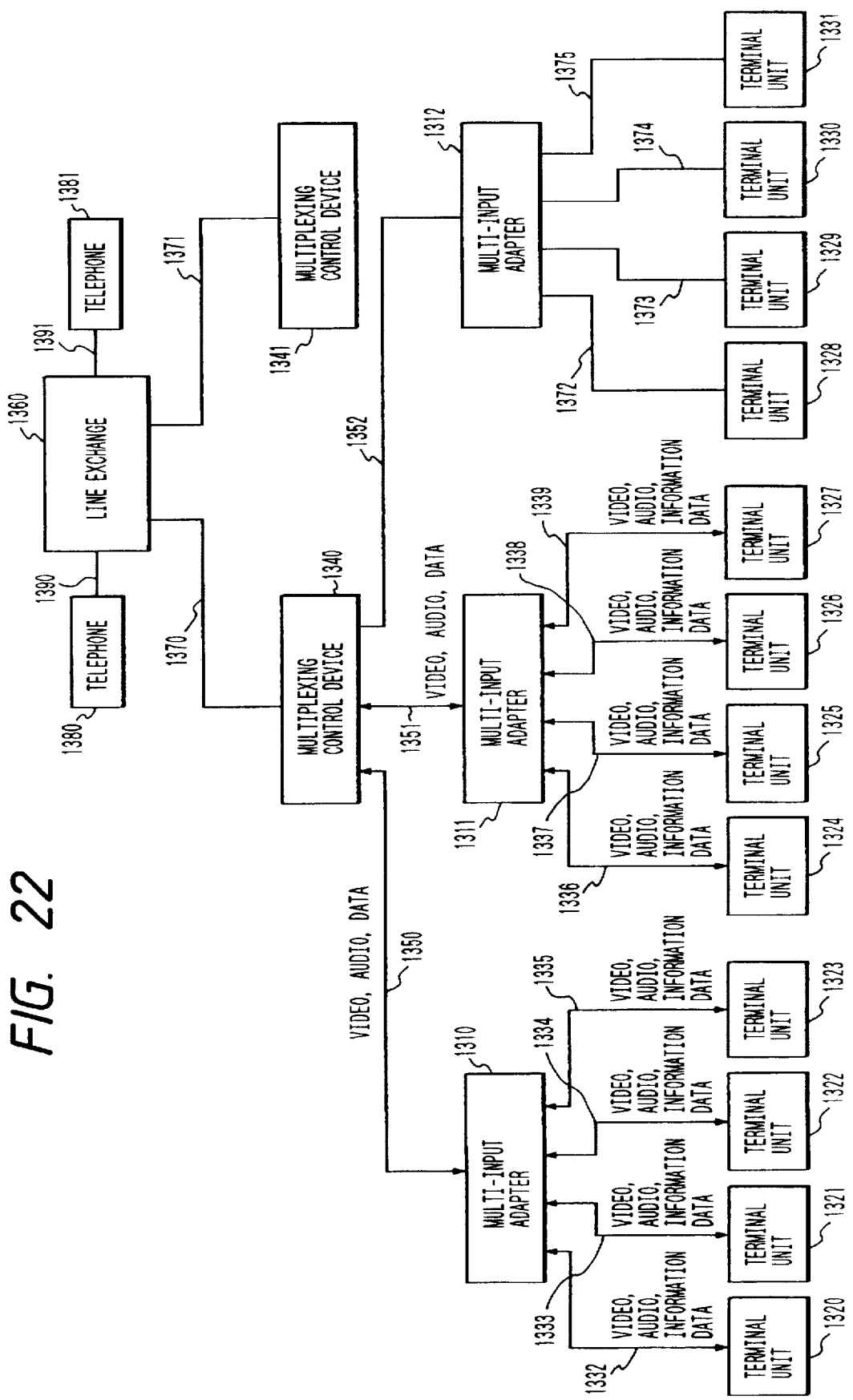
FIG. 22 is a block diagram showing the flow of data to be communicated in accordance with a procedure for executing a television conference between terminal units of a group A and terminal units of a group B.

FIG. 19 shows the arrangement of the audio data control unit 1411 in FIG. 17. Referring to FIG. 19, audio data transmitted from the terminal units 1320 to 1323 are subjected to addition processing in an adder 1400. The resultant audio data is output to the data multiplexing-separating control unit 1413. In addition, audio data separated from the multiplex data transmitted through the communication line 1350 by the data multiplexing-separating control unit 1413 is added to the audio data formed by the above addition processing by each of adders 1401 to 1404. Subtracters 1405 to 1408 respectively subtract the audio data output from the respective terminal units from the audio data from the adders 1401 to 1404 to form audio data. The audio data are then supplied to the terminal units 1320 to 1327, respectively. Note that a similar operation is performed for the remaining terminal units 1321 to 1327.

The data multiplexing-separating control unit 1413 outputs multiplex data formed by receiving and multiplexing data respectively processed by the video data control unit 1410, the audio data control unit 1411, and the information data control unit 1412 to the communication line 1350. The data multiplexing-separating control unit 1413 also separates video data, audio data, and information data from multiplex data transmitted through the communication line 1350, and supplies the separated data to the video data control unit 1410, the audio data control unit 1411, and the information data control unit 1412, respectively.

The multiplexing control device 1340 in FIG. 16 further multiplexes a plurality of multiplex data supplied from a plurality of multi-input adapters (the three multi-input adapters 1310 to 1312 in this embodiment), and outputs the resultant data to the line exchange 1360 through the communication line 1370. Although a plurality of terminal units for television conferences are connected to the other multiplexing control device 1341 in FIG. 16 through a plurality of multi-input adapters, similar to the multiplexing control device 1340, an illustration of this arrangement is omitted.

The operation of this embodiment will be described below with reference to FIGS. 20 to 24.

In this embodiment, the terminal units 1320 to 1323 constitute a group A, and the terminal units 1324 to 1327 constitute a group B, and a television conference is to be performed between the groups A and B. Assume that the terminal unit 1320 of the group A performs a calling operation with respect to the terminal unit 1324 of the group B to request the opening of a television conference, and the television conference is started by this operation.

The terminal unit 1320 outputs information data indicating a calling command and a called number, which is used to call the terminal unit 1324, to the multi-input adapter 1310 through the communication line 1332, thus calling the terminal unit 1324 and requesting the opening of a television conference. In addition, the terminal unit 1320 supplies video and audio data to the multi-input adapter 1310. Video and audio data are also supplied from terminal units, of the remaining terminal units 1321 to 1323 of the group A, which participate in the television conference, to the multi-input adapter 1310. The multi-input adapter 1310 outputs the information data indicating the calling command and the called number, of the data supplied from these terminal units, to the communication line 1350.

As described above, the information data output from the multi-input adapter 1310 is input to the line exchange 1360 through the communication line 1350, the multiplexing control device 1340, and the communication line 1370. The line exchange 1360 outputs the called number for the terminal unit 1324 to the terminal unit 1324 through the communication line 1370, the multiplexing control device 1340, the communication line 1351, the multi-input adapter 1311, and the communication line 1336 in accordance with the input information data (see FIG. 20).

Upon reception of the called number from the line exchange 1360, the terminal unit 1324 outputs information data indicating an acceptance command to the multi-input adapter 1311 when a preparation for the opening of the television conference is completed. In addition, the terminal unit 1324 supplies video and audio data to the multi-input adapter 1311. Video and audio data are also supplied from terminal units, of the remaining terminal units 1325 to 1327 of the group B, which participate in the television conference, to the multi-input adapter 1311. The multi-input adapter 1311 outputs the information data indicating the acceptance command, of the data supplied from these terminal units, to the communication line 1351 (see FIG. 21).

Upon reception of the information data indicating the acceptance command from the terminal unit 1324, the line exchange 1360 sets lines between the groups A and B. The multi-input adapters 1310 and 1311 respectively output multiplex data, which are formed by multiplexing various data output from the terminal units of the respective groups, to the communication lines 1350 and 1351. The multi-input adapters 1310 and 1311 also separate video data, audio data, and information data from multiplex data transmitted through the communication lines 1350 and 1351, and supply the data to the respective terminal units. As a result, video data like the one shown in FIG. 18 and audio data obtained by the arrangement shown in FIG. 19 are output to each terminal unit, thereby executing the television conference between the groups A and B (see FIG. 22).

An operation to be performed when the terminal unit 1320 performs a calling operation with respect to the telephone 1380 will be described next with reference to FIG. 23.

Figure 23:
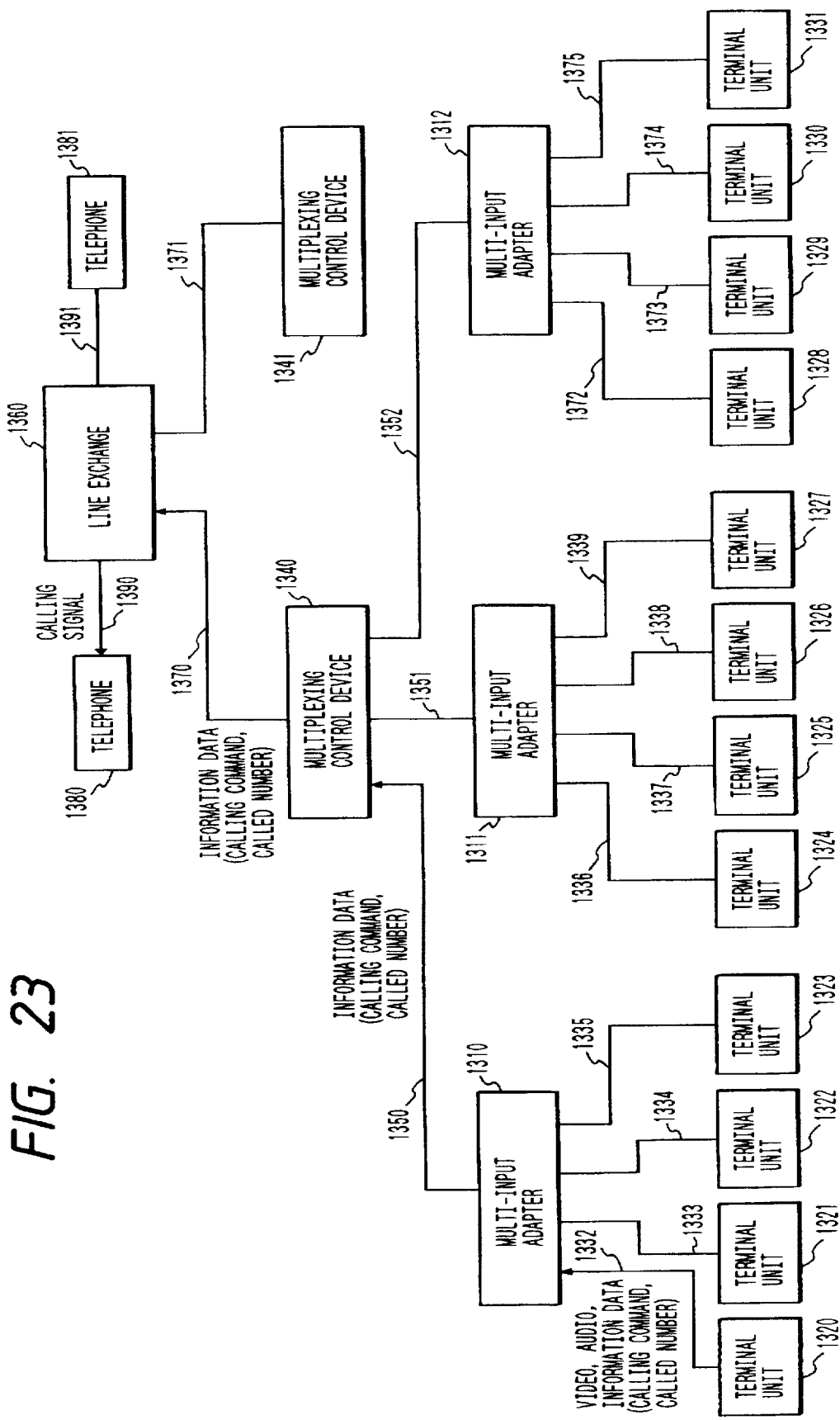
FIG. 23 is a block diagram showing the flow of data to be communicated in accordance with a procedure for a case wherein a given terminal unit calls a telephone.
Figure 24:
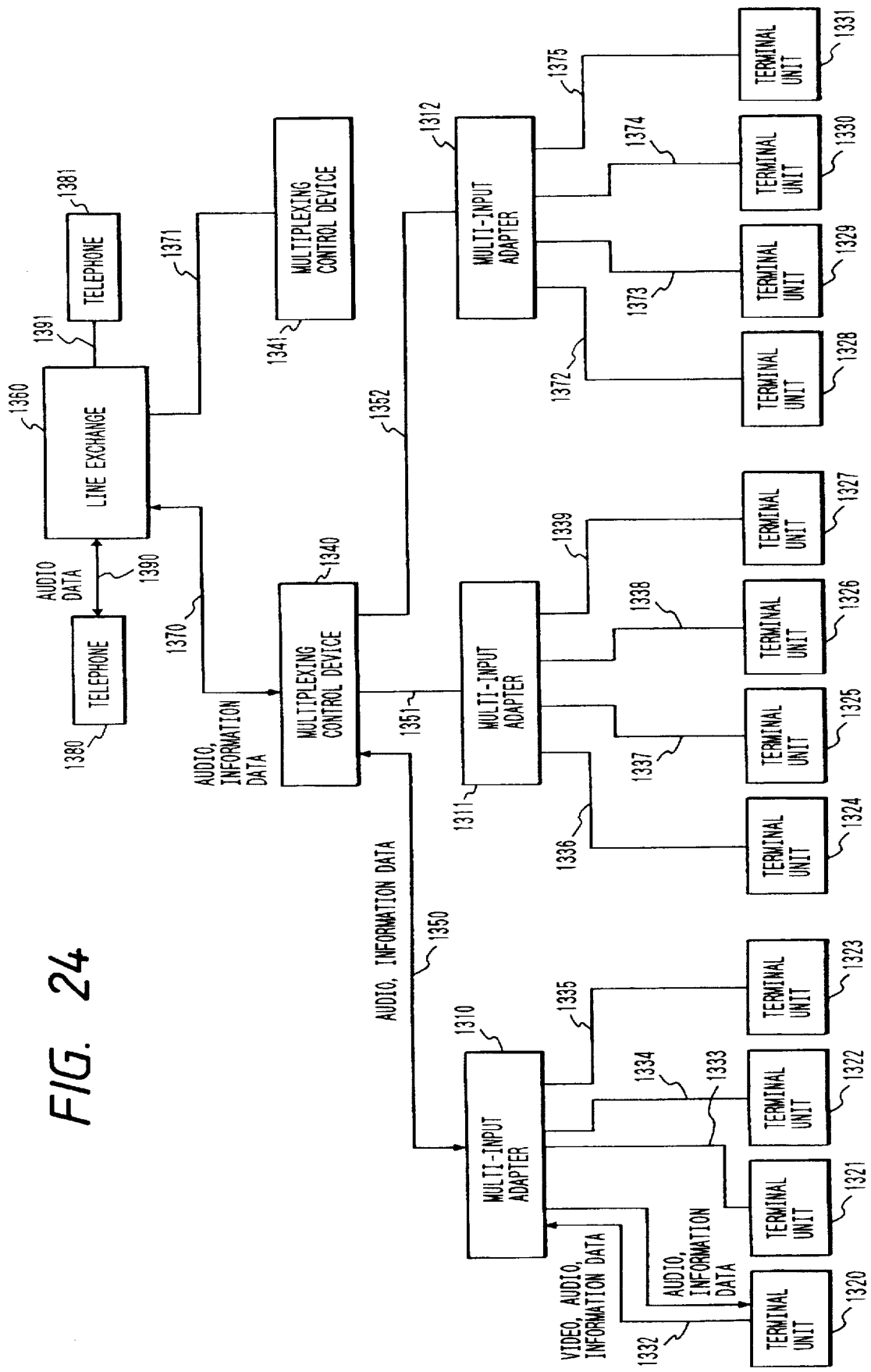
FIG. 24 is a block diagram showing the flow of data to be communicated in accordance with a procedure for a conversation between a terminal unit and a telephone.

Referring to FIG. 23, the terminal unit 1320 outputs information data indicating a calling command and a called number for the telephone 1380, and the calling signal is received by the telephone 1380. This operation is the same as that described with reference to FIG. 20 except that video and audio data are not output from the remaining terminal units 1321 to 1323 of the group A. The terminal unit 1320 outputs video and audio data to the multi-input adapter 1310 through the communication line 1332, and also outputs information data indicating a calling command and a called number for the telephone 1380 to the multi-input adapter 1310.

The multi-input adapter 1310 supplies the information data indicating the calling command and the called number, of the data supplied from the terminal unit 1320 in the above manner, to the line exchange 1360 through the communication line 1350, the multiplexing control device 1340, and the communication line 1370. The line exchange 1360 outputs a calling signal to the telephone 1380 through the communication line 1390 in accordance with the supplied information data.

Upon reception of the calling signal supplied from the line exchange 1360, the telephone 1380 outputs information data indicating an acceptance command to the line exchange 1360 when the telephone 1380 is set in an off-hook state which allows an answering operation. Upon reception of this information data indicating the acceptance command, the line exchange 1360 connects the communication line 1370 to the analog telephone line 1390.

When the communication line 1370 is connected to the analog telephone line 1390, an audio signal output from the telephone 1380 is input as multiplex data to the multi-input adapter 1310 through the line exchange 1360, the communication line 1370, the multiplexing control device 1340, and the communication line 1350, and is supplied to the terminal unit 1320. The telephone 1380 exchanges only audio and information signals. Multiplex data input from the telephone 1380 to the multi-input adapter 1310 has only audio and information data. For this reason, the multi-input adapter 1310 separates audio and information data from multiplex data supplied from the telephone 1380, and outputs them to the terminal unit 1320 through the communication line 1332. In addition, the multi-input adapter 1310 separates only audio and information data from multiplex data supplied from the terminal unit 1320 through the communication line 1332, and outputs the data to the communication line 1350 to supply them to the telephone 1380 (see FIG. 24).

The procedure for calling from the telephone 1380 to the terminal unit 1320 is reverse to the above procedure for calling from the terminal unit 1320 to the telephone 1380, and hence a detailed description thereof will be omitted.

In the above-described manner, conversation between a terminal unit for television conferences and an extension analog telephone can be realized.

As described above, according to the video communication system of this embodiment, since a line exchange having an interface for analog telephone line connection is arranged in the network of the television conference system, the network of the television conference system and an extension analog telephone line can be connected to each other.

In addition, according to the video communication system of this embodiment, the television conference system includes multi-input adapters in the network. Each multi-input adapter separates arbitrary types of data from video, audio, and information data output from a terminal unit for television conference, multiplexes the data, and sends the resultant data to the network, thereby transmitting the data to a remote or distant terminal unit. The multi-input adapter also separates data included in multiplex data sent from a remote terminal unit through the network, and outputs the data to a self or local terminal unit. In addition, the multi-input adapter discriminates the types of data included in multiplex data sent from a remote terminal unit, separates data corresponding to the types of data sent from the remote terminal unit from video, audio, and information data supplied from a self terminal unit, and sends the separated data to the remote terminal unit through the network. With these functions of each multi-input adapter, data of the same types as those of data sent from a remote terminal unit are selected from various data output from a self terminal unit, and the selected data are transmitted, thereby allowing conversation between an analog telephone capable of transmitting only audio and information data and a terminal unit for television conferences.

As has been described above, according to this embodiment, since a network in a television conference system can be connected to an analog telephone line with a simple arrangement, conversation between a terminal unit for television conferences and an analog telephone can be performed, thus realizing a video communication system which is easy to operate at a low cost.

What is claimed is:

1. A video communication system having a transmission line, said system comprising:

(A) a plurality of terminal units for transmitting/receiving information signals, each said terminal unit including DC voltage signal addition means for adding a DC voltage signal to a terminal output information signal, each terminal unit being arranged to cause said DC voltage signal addition means to add or not to add a DC voltage signal to a blanking period of said terminal output information signal depending on whether said each terminal unit is transmitting said terminal output information signal to another terminal unit; and (B) a repeater to which the plurality of terminal units are connected, said repeater (i) forming a transmission signal to be sent to the transmission line by frequency-multiplexing the terminal output information signals respectively transmitted from the plurality of terminal units, or (ii) receiving a transmission signal supplied from the transmission line and supplying a plurality of terminal output information signals frequency-multiplexed with the received transmission signal to a terminal unit.

2. A system according to claim 1, wherein each said terminal unit includes:

(a) reference sync. signal separation means for separating a reference sync. signal from a signal supplied from said repeater; and (b) video information signal generating means for generating a video information signal in synchronism with the reference sync. signal separated by said reference sync. signal separation means.

3. A system according to claim 1, wherein said repeater includes:

(a) detection means for detecting the presence/absence of said DC voltage signal in the terminal output information signal supplied from a connected terminal unit;

(b) frequency modulation means, operable in accordance with the detection result from said detection means, for frequency-modulating the terminal output information signal supplied from the connected terminal unit and outputting the frequency-modulated terminal output information signal; and (c) DC voltage signal addition means for adding a DC voltage signal to a blanking period of the frequency-modulated terminal output information signal output from said frequency modulation means in accordance with the detection result from said detection means and outputting the signal.

4. A system according to claim 3, wherein said repeater includes:

(a) detection means for detecting the presence/absence of said DC voltage signal in the terminal output information signal supplied from a connected exchange;

(b) frequency demodulation means, operable in accordance with the detection result from said detection means, for frequency-demodulating said frequency-modulated terminal output information signal supplied from said connected exchange and outputting the frequency-demodulated information signal; and (c) DC voltage signal addition means for adding a DC voltage signal to a blanking period of the frequency-demodulated information signal output from said frequency demodulation means in accordance with the detection result from said detection means, and outputting the signal.

5. A system according to claim 1, wherein said each terminal unit includes:

(a) video signal generating means for generating a video signal to be transmitted;

(b) audio signal generating means for generating an audio signal to be transmitted;

(c) data signal generating means for generating a data signal to be transmitted;

(d) video frequency modulation means for forming a frequency-modulated video signal by frequency-modulating a video signal generated by said video signal generating means, and outputting the signal;

(e) audio frequency modulation means for forming a frequency-modulated audio signal by frequency-modulating an audio signal generated by said audio signal generating means, and outputting the signal; and (f) information signal forming means for adding a data signal generated by said data signal generating means to a vertical blanking period of a frequency-modulated video signal output from said video frequency modulation means, and forming an information signal by frequency-multiplexing the frequency-modulated video signal having the data signal added to the vertical blanking period and the frequency-modulated audio signal output from said audio frequency modulation means.

6. A system according to claim 5, wherein said each terminal unit includes:

(a) separation means for separating a frequency-modulated video signal, a frequency-modulated audio signal, and a data signal from a signal supplied from a connected repeater;

(b) video frequency demodulation means for forming a video signal by frequency-demodulating the frequency-modulated video signal separated by said separation means, and outputting the video signal;

(c) audio frequency demodulation means for forming an audio signal by frequency-demodulating the frequency-modulated audio signal separated by said separation means, and outputting the audio signal;

(d) display means for performing a display operation corresponding to the video signal output from said video frequency demodulation means; and (e) speech generating means for generating speech corresponding to an audio signal output from said audio frequency demodulation means.

7. A video communication system having a transmission line, said system comprising:

(A) first and second pluralities of terminal units for transmitting/receiving information signals including video information, each said terminal unit including DC voltage signal addition means for adding a DC voltage signal to a terminal output information signal, each terminal unit being arranged to cause said DC voltage signal addition means to add or not to add a DC voltage signal to a blanking period of said terminal output information signal depending on whether said each terminal unit is transmitting said terminal output information signal to another terminal unit;

(B) a plurality of repeaters including a first repeater connected to the first plurality of terminal units and a second repeater connected to the second plurality of terminal units, each repeater (i) forming a transmission signal to be sent to the transmission line by frequency-multiplexing the terminal output information signals respectively transmitted from the corresponding plurality of terminal units, or (ii) receiving a transmission signal supplied from the transmission line and supplying a plurality of terminal output information signals frequency-multiplexed with the received transmission signal to the corresponding plurality of terminal units; and (c) an exchange connected to the plurality of repeaters, said exchange forming a communication channel between arbitrary terminal units of said first and second pluralities of terminal units to allow communication of the terminal output information signals between said arbitrary terminal units.

8. A system according to claim 7, wherein said each repeater includes DC voltage signal addition means for adding a DC voltage signal to terminal output information signals for the corresponding plurality of terminal units, and is arranged to cause DC voltage signal addition means to add or not to add a DC voltage signal to a blanking period of the terminal output information signal for a terminal unit for which a communication channel is formed by said exchange depending on whether a conversation request is generated with respect to one of the plurality of connected terminal units.

9. A system according to claim 7, wherein said exchange includes:

(a) detection means for detecting the presence/absence of said DC voltage signal component in a signal supplied from a connected repeater; and (b) DC voltage signal addition means for adding a DC voltage signal to a blanking period of the terminal output information signal for said connected repeater in accordance with the detection result from said detection means.

10. A system according to claim 7, wherein the transmission line has a transmission frequency band, the transmission frequency band including a plurality of narrow frequency bands separated from each other, and the plurality of narrow frequency bands including frequency bands for transmission and reception signals respectively having different frequency bands.

11. A system according to claim 7, wherein said each repeater includes:

(a) detection mean for detecting the presence/absence of the DC voltage signal in the terminal output information signal supplied from a connected terminal unit;

(b) frequency modulation means, operable in accordance with the detection result from said detection means, for frequency-modulating a terminal output information signal supplied from said connected terminal unit and outputting the frequency-modulated terminal output information signal; and (c) DC voltage signal addition means for adding a DC voltage signal to a blanking period of the frequency-modulated terminal output information signal output from said frequency modulation means in accordance with the detection result from said detection means and outputting the signal.

12. A system according to claim 11, wherein said each repeater includes:

(a) detection means for detecting the presence/absence of the DC voltage signal in the terminal output information signal supplied from the connected exchange;

(b) frequency demodulation means, operable in accordance with the detection result from said detection means, for frequency-demodulating the frequency-modulated terminal output information signal supplied from said connected exchange and outputting the frequency-demodulated information signal; and (c) DC voltage signal addition means for adding a DC voltage signal to a blanking period of the frequency-demodulated information signal output from said frequency demodulation means in accordance with the detection result from said detection means, and outputting the signal.

13. A system according to claim 7, wherein the information signal includes audio information and data in addition to the video information.

14. A system according to claim 13, wherein said each terminal unit includes:

(a) video signal generating means for generating a video signal to be transmitted;

(b) audio signal generating means for generating an audio signal to be transmitted;

(c) data signal generating means for generating a data signal to be transmitted;

(d) video frequency modulation means for forming a frequency-modulated video signal by frequency-modulating a video signal generated by said video signal generating means, and outputting the signal;

(e) audio frequency modulation means for forming a frequency-modulated audio signal by frequency-modulating an audio signal generated by said audio signal generating means, and outputting the signal; and (f) information signal forming means for adding a data signal generated by said data signal generating means to a vertical blanking period of a frequency-modulated video signal output from said video frequency modulation means, and forming an information signal by frequency-multiplexing the frequency-modulated video signal having the data signal added to the vertical blanking period and the frequency-modulated audio signal output from said audio frequency modulation means.

15. A system according to claim 14, wherein said each terminal unit includes:

(a) separation means for separating a frequency-modulated video signal, a frequency-modulated audio signal, and a data signal from a signal supplied from a connected repeater;

(b) video frequency demodulation means for forming a video signal by frequency-demodulating the frequency-modulated video signal separated by said separation means, and outputting the video signal;

(c) audio frequency demodulation means for forming an audio signal by frequency-demodulating the frequency-modulated audio signal separated by said separation means, and outputting the audio signal;

(d) display means for performing a display operation corresponding to the video signal output from said video frequency demodulation means; and (e) speech generating means for generating speech corresponding to an audio signal output from said audio frequency demodulation means.

16. A system according to claim 7, wherein said each terminal unit includes:

(a) video signal generating means for generating a video signal to be transmitted;

(b) terminal designation data signal generating means for generating a terminal designation data signal for designating another terminal unit as a transmission partner of said terminal unit;

(c) video frequency modulation means for forming a frequency-modulated video signal by frequency-modulating the video signal generated by said video signal generating means, and outputting the frequency-modulated video signal; and (d) information signal forming means for forming an information signal by adding the terminal designation data signal generated by said terminal designation data signal generating means to the vertical blanking period of the frequency-modulated video signal output from said video frequency modulation means.

17. A system according to claim 16, wherein said exchange is arranged to form a communication channel between a terminal unit designated by the terminal designation data included in the signal supplied from said connected repeater and said terminal unit which has generated the terminal designation data.

18. A system according to claim 12, wherein said exchange is arranged such that an interface for connection to an external terminal unit through an external line can be connected to said exchange.

19. A video communication system having a transmission network, said system comprising:

(A) first and second pluralities of terminal units for transmitting/receiving an information signal including video and audio data, each said terminal unit including DC voltage signal addition means for adding a DC voltage signal to a terminal output information signal, each terminal unit being arranged to cause said DC voltage signal addition means to add or not to add a DC voltage signal to a blanking period of said terminal output information signal depending on whether said each terminal unit is transmitting said terminal output information signal to another terminal unit;

(B) a plurality of repeaters including a first repeater connected to the first plurality of terminal units and a second repeater connected to the second plurality of terminal units, each repeater (i) classifying various data included in the terminal output information signals respectively output from the corresponding plurality of terminal units in units of types, and frequency-multiplexing the classified data in units of types, thereby forming transmission signals to be transmitted through the network, or (ii) receiving transmission signals supplied from the network, classifying various data which are frequency-multiplexed in units of types and included in the received transmission signals, in units of types, and respectively supplying the classified data to the corresponding plurality of terminal units;

(C) an exchange which is connected to the network and to the plurality of repeaters, said exchange forming a communication channel between arbitrary terminal units of said first and second pluralities of terminal units to allow communication of the transmission signals between said arbitrary terminal units, and connecting the network to a telephone line; and (D) a telephone which can be connected to the telephone line.

20. A system according to claim 19, wherein said each repeater has a function of classifying various data included in the terminal output information signals respectively output from the first and second pluralities of terminal units in units of types, and sending transmission signals formed by frequency-multiplexing the classified data in units of types to the network.

21. A system according to claim 19, wherein said each repeater has a function of classifying various data, which are frequency multiplexed in units of types and included in transmission signals supplied from the network, in units of types, and respectively supplying the classified data to the corresponding plurality of terminal units.

22. A system according to claim 19, wherein said each repeater has a function of discriminating types of data included in transmission signals supplied from the network.

23. A system according to claim 19, wherein said each repeater has a function of classifying data of types corresponding to types of data included in transmission signals supplied from the network from various data included in the terminal output information signals respectively output from the corresponding plurality of terminal units, and sending transmission signals formed by frequency multiplexing the classified data in units of types to the network.

24. A system according to claim 19, wherein the terminal output information signal further includes data indicating a calling command and a called number.

25. A system according to claim 19, wherein the terminal output information signal further includes data indicating an acceptance command.

* * * * *

UNITED STATES PATENT AND TRADEMARK OFFICE
CERTIFICATE OF CORRECTION

PATENT NO. : 5,777,664
DATED : July 7, 1998
INVENTOR(S) : TSUGUHIDE SAKATA, ET AL.

It is certified that error appears in the above-identified patent and that said Letters Patent is hereby corrected as shown below:

Column 4

Line 65, "cross point" should read --cross-point--.

Column 7

Line 18, "cross point" should read --cross-point--;
    Line 21, "cross point" should read --cross-point--; and
    Line 25, "cross point" should read --cross-point--.

Column 14

Line 54, "un its" should read --units--.

Column 26

Line 23, "frequency multiplexed" should read --frequency-multiplexed--.

Signed and Sealed this

Sixth Day of April, 1999

Attest:

Attesting Officer

Q. TODD DICKINSON

Acting Commissioner of Patents and Trademarks